(12) United States Patent
Fursdon-Welsh et al.

(10) Patent No.: US 10,294,757 B2
(45) Date of Patent: May 21, 2019

(54) METHODS AND COMPOSITIONS RELATED TO GELLED LAYERS IN OIL AND/OR GAS WELLS

(71) Applicant: Flotek Chemistry, LLC, Houston, TX (US)

(72) Inventors: Angus Fursdon-Welsh, The Woodlands, TX (US); James Silas, Cypress, TX (US); Monica Smith-Gonzalez, Spring, TX (US)

(73) Assignee: Flotek Chemistry, LLC, Houston, TX (US)

( * ) Notice: Subject to any disclaimer, the term of this patent is extended or adjusted under 35 U.S.C. 154(b) by 55 days.

(21) Appl. No.: 14/811,133

(22) Filed: Jul. 28, 2015

(65) Prior Publication Data

US 2016/0024890 A1    Jan. 28, 2016

Related U.S. Application Data

(60) Provisional application No. 62/074,229, filed on Nov. 3, 2014, provisional application No. 62/030,049, filed on Jul. 28, 2014.

(51) Int. Cl.
*E21B 37/06* (2006.01)
*C09K 8/52* (2006.01)
(Continued)

(52) U.S. Cl.
CPC .............. *E21B 37/06* (2013.01); *C09K 8/52* (2013.01); *C09K 8/602* (2013.01); *C09K 8/74* (2013.01);
(Continued)

(58) Field of Classification Search
CPC ................................ E21B 37/06; C09K 8/524
See application file for complete search history.

(56) References Cited

U.S. PATENT DOCUMENTS

| | | | |
|---|---|---|---|
| 3,060,210 | A | 4/1961 | De Groote |
| 3,047,062 | A | 7/1962 | Meadors |

(Continued)

FOREIGN PATENT DOCUMENTS

| | | |
|---|---|---|
| CN | 102127414 A | 7/2011 |
| CN | 102277143 B | 12/2011 |

(Continued)

OTHER PUBLICATIONS

[No Author Listed], The HLB system: a time-saving guide to emulsifier selection. ICI Americas Inc. 1976. 22 pages.

(Continued)

*Primary Examiner* — William D Hutton, Jr.
*Assistant Examiner* — Avi T Skaist
(74) *Attorney, Agent, or Firm* — Wolf, Greenfield & Sacks, P.C.

(57) ABSTRACT

Methods and compositions for the prevention of the formation, breakdown, and/or removal of gelled layers in an oil and/or gas well are provided. In some embodiments, the compositions and methods comprise a concentrate, as described in more detail herein, where the concentrate comprises two or more surfactants. In certain embodiments, the compositions and methods comprise an emulsion or a microemulsion. The emulsion or microemulsion may include a surfactant, optionally a solvent, and optionally a freezing point depression agent or other components.

13 Claims, 1 Drawing Sheet

(51) Int. Cl.
*C09K 8/60* (2006.01)
*C09K 8/74* (2006.01)

(52) U.S. Cl.
CPC ...... *C09K 2208/26* (2013.01); *C09K 2208/32* (2013.01)

(56) References Cited

U.S. PATENT DOCUMENTS

| | | | |
|---|---|---|---|
| 3,347,789 A | 10/1967 | Dickson et al. |
| 3,368,624 A | 2/1968 | Heuer et al. |
| 3,483,923 A | 12/1969 | Darley |
| 3,710,865 A | 1/1973 | Kiel |
| 3,756,319 A | 9/1973 | Holm et al. |
| 3,760,881 A | 9/1973 | Kiel |
| 3,850,248 A | 11/1974 | Carney |
| 3,919,411 A | 11/1975 | Glass et al. |
| 4,005,020 A | 1/1977 | McCormick |
| 4,206,809 A | 6/1980 | Jones |
| 4,233,165 A | 11/1980 | Salathiel et al. |
| 4,276,935 A | 7/1981 | Hessert et al. |
| 4,360,061 A | 11/1982 | Canter et al. |
| 4,414,128 A | 11/1983 | Goffinet |
| 4,472,291 A | 9/1984 | Rosano |
| 4,511,488 A | 4/1985 | Matta |
| 4,650,000 A | 3/1987 | Andreasson et al. |
| 4,844,756 A | 7/1989 | Forsberg |
| 5,008,026 A | 4/1991 | Gardner et al. |
| 5,034,140 A | 7/1991 | Gardner et al. |
| 5,076,954 A | 12/1991 | Loth et al. |
| 5,083,613 A | 1/1992 | Gregoli et al. |
| 5,095,989 A | 3/1992 | Prukop |
| 5,217,531 A | 6/1993 | Cheung |
| 5,247,995 A | 9/1993 | Tjon-Joe-Pin et al. |
| 5,310,002 A | 5/1994 | Blauch et al. |
| 5,356,482 A | 10/1994 | Mehta et al. |
| 5,567,675 A | 10/1996 | Romocki |
| 5,587,354 A | 12/1996 | Duncan, Jr. |
| 5,587,357 A | 12/1996 | Rhinesmith |
| 5,604,195 A | 2/1997 | Misselyn et al. |
| 5,652,200 A | 7/1997 | Davies et al. |
| 5,665,689 A | 9/1997 | Durbut |
| 5,676,763 A | 10/1997 | Salisbury et al. |
| 5,697,458 A | 12/1997 | Carney |
| 5,707,940 A | 1/1998 | Bush et al. |
| 5,762,138 A | 6/1998 | Ford et al. |
| 5,784,386 A | 7/1998 | Norris |
| 5,811,383 A | 9/1998 | Klier et al. |
| 5,830,831 A | 11/1998 | Chan et al. |
| 5,874,386 A | 2/1999 | Chan et al. |
| 5,925,233 A | 7/1999 | Miller et al. |
| 5,975,206 A | 11/1999 | Woo et al. |
| 5,977,032 A | 11/1999 | Chan |
| 5,990,072 A | 11/1999 | Gross et al. |
| 5,996,692 A | 12/1999 | Chan et al. |
| 6,046,140 A | 4/2000 | Woo et al. |
| 6,090,754 A | 7/2000 | Chan et al. |
| 6,110,885 A | 8/2000 | Chan |
| 6,112,814 A | 9/2000 | Chan et al. |
| 6,165,946 A | 12/2000 | Mueller et al. |
| 6,173,776 B1 | 1/2001 | Furman et al. |
| 6,191,090 B1 | 2/2001 | Mondin et al. |
| 6,228,830 B1 | 5/2001 | Vlasblom |
| 6,260,621 B1 | 7/2001 | Furman et al. |
| 6,302,209 B1 | 10/2001 | Thompson, Sr. et al. |
| 6,364,020 B1 | 4/2002 | Crawshaw et al. |
| 6,486,115 B1 | 11/2002 | Weaver et al. |
| 6,581,687 B2 | 6/2003 | Collins et al. |
| 6,593,279 B2 | 7/2003 | Von Krosigk et al. |
| 6,613,720 B1 | 9/2003 | Feraud et al. |
| 6,729,402 B2 | 5/2004 | Chang et al. |
| 6,770,603 B1 | 8/2004 | Sawdon et al. |
| 6,793,025 B2 | 9/2004 | Patel et al. |
| 6,800,593 B2 | 10/2004 | Dobson, Jr. et al. |
| 6,818,595 B2 | 11/2004 | Benton et al. |
| 6,911,417 B2 | 6/2005 | Chan et al. |
| 6,914,040 B2 | 7/2005 | Deak et al. |
| 6,939,832 B2 | 9/2005 | Collins |
| 6,972,274 B1 | 12/2005 | Slikta et al. |
| 6,984,610 B2 | 1/2006 | VonKrosigk et al. |
| 7,021,378 B2 | 4/2006 | Prukop |
| 7,122,509 B2 | 10/2006 | Sanner et al. |
| 7,134,496 B2 | 11/2006 | Jones et al. |
| 7,205,262 B2 | 4/2007 | Schwartz et al. |
| 7,205,264 B2 | 4/2007 | Boles |
| 7,231,976 B2 | 6/2007 | Berry et al. |
| 7,380,606 B2 | 6/2008 | Pursley et al. |
| 7,392,844 B2 | 7/2008 | Berry et al. |
| 7,407,915 B2 | 8/2008 | Jones et al. |
| 7,468,402 B2 | 12/2008 | Yang et al. |
| 7,481,273 B2 | 1/2009 | Javora et al. |
| 7,514,390 B2 | 4/2009 | Chan |
| 7,514,391 B2 | 4/2009 | Chan |
| 7,533,723 B2 | 5/2009 | Hughes et al. |
| 7,543,644 B2 | 6/2009 | Huang et al. |
| 7,543,646 B2 | 6/2009 | Huang et al. |
| 7,547,665 B2 | 6/2009 | Welton et al. |
| 7,552,771 B2 | 6/2009 | Eoff et al. |
| 7,559,369 B2 | 7/2009 | Roddy et al. |
| 7,581,594 B2 | 9/2009 | Tang |
| 7,615,516 B2 | 11/2009 | Yang et al. |
| 7,621,334 B2 | 11/2009 | Welton et al. |
| 7,622,436 B2 | 11/2009 | Tuzi et al. |
| 7,655,603 B2 | 2/2010 | Crews |
| 7,677,311 B2 | 3/2010 | Abad et al. |
| 7,687,439 B2 | 3/2010 | Jones et al. |
| 7,709,421 B2 | 5/2010 | Jones et al. |
| 7,712,534 B2 | 5/2010 | Bryant et al. |
| 7,727,936 B2 | 6/2010 | Pauls et al. |
| 7,727,937 B2 | 6/2010 | Pauls et al. |
| 7,730,958 B2 | 6/2010 | Smith |
| 7,825,073 B2 | 11/2010 | Welton et al. |
| 7,833,943 B2 | 11/2010 | Van Zanten et al. |
| 7,838,467 B2 | 11/2010 | Jones et al. |
| 7,846,877 B1 | 12/2010 | Robb |
| 7,851,414 B2 | 12/2010 | Yang et al. |
| 7,855,168 B2 | 12/2010 | Fuller et al. |
| 7,857,051 B2 | 12/2010 | Abad et al. |
| 7,886,824 B2 | 2/2011 | Kakadjian et al. |
| 7,893,010 B2 | 2/2011 | Ali et al. |
| 7,902,123 B2 | 3/2011 | Harrison et al. |
| 7,906,464 B2 | 3/2011 | Davidson |
| 7,910,524 B2 | 3/2011 | Welton et al. |
| 7,931,088 B2 | 4/2011 | Stegemoeller et al. |
| 7,960,314 B2 | 6/2011 | Van Zanten et al. |
| 7,960,315 B2 | 6/2011 | Welton et al. |
| 7,963,720 B2 | 6/2011 | Hoag et al. |
| 7,971,659 B2 | 7/2011 | Gatlin et al. |
| 7,976,241 B2 | 7/2011 | Hoag et al. |
| 7,989,404 B2 | 8/2011 | Kakadjian et al. |
| 7,992,656 B2 | 8/2011 | Dusterhoft et al. |
| 7,998,911 B1 | 8/2011 | Berger et al. |
| 8,043,996 B2 | 10/2011 | Harris |
| 8,053,396 B2 | 11/2011 | Huff et al. |
| 8,053,397 B2 | 11/2011 | Huang et al. |
| 8,057,682 B2 | 11/2011 | Hoag et al. |
| 8,091,644 B2 | 1/2012 | Clark et al. |
| 8,091,645 B2 | 1/2012 | Quintero et al. |
| 8,091,646 B2 | 1/2012 | Quintero et al. |
| 8,100,190 B2 | 1/2012 | Weaver et al. |
| 8,148,303 B2 | 4/2012 | Van Zanten et al. |
| 8,183,182 B2 | 5/2012 | Oliveira et al. |
| 8,206,062 B2 | 6/2012 | Hoag et al. |
| 8,207,096 B2 | 6/2012 | van Zanten et al. |
| 8,210,263 B2 | 7/2012 | Quintero et al. |
| 8,220,546 B2 | 7/2012 | Kakadjian et al. |
| 8,227,382 B2 | 7/2012 | Dakin et al. |
| 8,231,947 B2 | 7/2012 | Vaidya et al. |
| 8,235,120 B2 | 8/2012 | Quintero et al. |
| 8,242,059 B2 | 8/2012 | Sawdon |
| 8,293,687 B2 | 10/2012 | Giffin |
| 8,342,241 B2 | 1/2013 | Hartshorne et al. |
| 8,349,771 B2 | 1/2013 | Seth et al. |
| 8,356,667 B2 | 1/2013 | Quintero et al. |
| 8,357,639 B2 | 1/2013 | Quintero et al. |

(56) References Cited

U.S. PATENT DOCUMENTS

| | | | |
|---|---|---|---|
| 8,372,789 B2 | 2/2013 | Harris et al. | |
| 8,383,560 B2 | 2/2013 | Pich et al. | |
| 8,403,051 B2 | 3/2013 | Huang et al. | |
| 8,404,623 B2 | 3/2013 | Robb et al. | |
| 8,413,721 B2 | 4/2013 | Welton et al. | |
| 8,415,279 B2 | 4/2013 | Quintero et al. | |
| 8,431,620 B2 | 4/2013 | Del Gaudio et al. | |
| 8,453,741 B2 | 6/2013 | van Zanten | |
| 8,499,832 B2 | 8/2013 | Crews et al. | |
| 8,517,100 B2 | 8/2013 | Ali et al. | |
| 8,517,104 B2 | 8/2013 | Kieffer | |
| 8,524,643 B2 | 9/2013 | Huff et al. | |
| 8,551,926 B2 | 10/2013 | Huang et al. | |
| 8,592,350 B2 | 11/2013 | van Zanten et al. | |
| 8,684,079 B2 | 4/2014 | Wattenbarger et al. | |
| 8,778,850 B2 | 7/2014 | Andrecola | |
| 8,865,632 B1 | 10/2014 | Parnell et al. | |
| 9,068,108 B2 | 6/2015 | Hill et al. | |
| 9,200,192 B2 | 12/2015 | Zelenev et al. | |
| 9,222,013 B1 | 12/2015 | Champagne et al. | |
| 9,957,779 B2 | 5/2018 | Fursdon-Welsh et al. | |
| 2001/0007663 A1 | 7/2001 | Von Corswant | |
| 2002/0132740 A1* | 9/2002 | Von Krosigk | C09K 8/52 507/200 |
| 2003/0022944 A1 | 1/2003 | Gumkowski et al. | |
| 2003/0069143 A1* | 4/2003 | Collins | C09K 8/52 507/200 |
| 2003/0232095 A1 | 12/2003 | Garti et al. | |
| 2006/0014648 A1 | 1/2006 | Milson et al. | |
| 2006/0211593 A1 | 9/2006 | Smith et al. | |
| 2006/0254774 A1 | 11/2006 | Saini et al. | |
| 2006/0258541 A1 | 11/2006 | Crews | |
| 2007/0027046 A1* | 2/2007 | Friend | C09K 8/524 508/545 |
| 2007/0123445 A1 | 5/2007 | Tuzi et al. | |
| 2007/0293404 A1 | 12/2007 | Hutchins et al. | |
| 2007/0295368 A1 | 12/2007 | Harrison et al. | |
| 2008/0169103 A1 | 7/2008 | Carbajal et al. | |
| 2008/0274918 A1 | 11/2008 | Quintero et al. | |
| 2008/0287324 A1 | 11/2008 | Pursley et al. | |
| 2009/0078415 A1 | 3/2009 | Fan et al. | |
| 2009/0137432 A1 | 5/2009 | Sullivan et al. | |
| 2009/0159288 A1 | 6/2009 | Horvath Szabo et al. | |
| 2009/0221456 A1 | 9/2009 | Harrison et al. | |
| 2009/0260819 A1 | 10/2009 | Kurian et al. | |
| 2009/0275488 A1 | 11/2009 | Zamora et al. | |
| 2009/0281004 A1 | 11/2009 | Ali et al. | |
| 2010/0022421 A1 | 1/2010 | Gutierrez et al. | |
| 2010/0173805 A1 | 7/2010 | Pomerleau | |
| 2010/0216670 A1 | 8/2010 | Del Gaudio et al. | |
| 2010/0243248 A1 | 9/2010 | Golomb et al. | |
| 2010/0252267 A1 | 10/2010 | Harris et al. | |
| 2010/0263863 A1 | 10/2010 | Quintero et al. | |
| 2010/0272765 A1 | 10/2010 | Ho et al. | |
| 2010/0307757 A1 | 12/2010 | Blow et al. | |
| 2011/0021386 A1 | 1/2011 | Ali et al. | |
| 2011/0136706 A1 | 6/2011 | Carroll et al. | |
| 2011/0146983 A1 | 6/2011 | Sawdon | |
| 2011/0190174 A1 | 8/2011 | Weerasooriya et al. | |
| 2011/0220353 A1 | 9/2011 | Bittner et al. | |
| 2011/0237467 A1 | 9/2011 | Cornette et al. | |
| 2011/0253365 A1 | 10/2011 | Crews et al. | |
| 2011/0290491 A1 | 12/2011 | Gupta et al. | |
| 2012/0000708 A1 | 1/2012 | Van Zanten et al. | |
| 2012/0004146 A1 | 1/2012 | Van Zanten et al. | |
| 2012/0015852 A1 | 1/2012 | Quintero et al. | |
| 2012/0071366 A1 | 3/2012 | Falana et al. | |
| 2012/0080232 A1 | 4/2012 | Muller et al. | |
| 2012/0129738 A1 | 5/2012 | Gupta et al. | |
| 2012/0149626 A1 | 6/2012 | Fluck et al. | |
| 2012/0168165 A1 | 7/2012 | Holcomb et al. | |
| 2012/0181019 A1 | 7/2012 | Saini et al. | |
| 2012/0186877 A1 | 7/2012 | Ezell | |
| 2012/0193095 A1 | 8/2012 | Varadaraj et al. | |
| 2012/0208726 A1 | 8/2012 | Smith et al. | |
| 2012/0234548 A1 | 9/2012 | Dyer | |
| 2012/0241155 A1 | 9/2012 | Ali et al. | |
| 2012/0241220 A1 | 9/2012 | Quintero et al. | |
| 2012/0255887 A1 | 10/2012 | Holms et al. | |
| 2012/0261120 A1 | 10/2012 | Del Gaudio et al. | |
| 2012/0279711 A1 | 11/2012 | Collins et al. | |
| 2012/0285690 A1 | 11/2012 | Weaver et al. | |
| 2012/0285694 A1 | 11/2012 | Morvan et al. | |
| 2012/0318504 A1 | 12/2012 | Fan et al. | |
| 2012/0318515 A1 | 12/2012 | Cawiezel et al. | |
| 2012/0322697 A1 | 12/2012 | Zhang | |
| 2012/0325492 A1 | 12/2012 | Fefer et al. | |
| 2013/0029883 A1 | 1/2013 | Dismuke et al. | |
| 2013/0048281 A1 | 2/2013 | Van Zanten et al. | |
| 2013/0079255 A1 | 3/2013 | Del Gaudio et al. | |
| 2013/0109597 A1 | 5/2013 | Sarkar et al. | |
| 2013/0133886 A1 | 5/2013 | Quintero | |
| 2013/0137611 A1 | 5/2013 | Pierce et al. | |
| 2013/0146288 A1 | 6/2013 | Smith et al. | |
| 2013/0146545 A1 | 6/2013 | Pabalan et al. | |
| 2013/0153232 A1 | 6/2013 | Bobier et al. | |
| 2013/0153234 A1 | 6/2013 | Bobier et al. | |
| 2013/0192826 A1 | 8/2013 | Kurian et al. | |
| 2013/0233559 A1 | 9/2013 | van Zanten et al. | |
| 2013/0244913 A1 | 9/2013 | Maberry et al. | |
| 2013/0261033 A1 | 10/2013 | Nguyen | |
| 2013/0292121 A1 | 11/2013 | Penny et al. | |
| 2014/0005079 A1 | 1/2014 | Dahanayake et al. | |
| 2014/0069643 A1 | 3/2014 | Ogle et al. | |
| 2014/0110344 A1 | 4/2014 | Hoag et al. | |
| 2014/0148371 A1 | 5/2014 | Man et al. | |
| 2014/0202700 A1 | 7/2014 | Blair | |
| 2014/0262274 A1 | 9/2014 | Dismuke et al. | |
| 2014/0262288 A1 | 9/2014 | Penny et al. | |
| 2014/0284057 A1 | 9/2014 | Champagne et al. | |
| 2014/0332212 A1 | 11/2014 | Ayers et al. | |
| 2014/0352945 A1 | 12/2014 | Danait et al. | |
| 2014/0367107 A1 | 12/2014 | Hill et al. | |
| 2015/0105302 A1 | 4/2015 | Pursley et al. | |
| 2015/0184061 A1* | 7/2015 | Saboowala | C09K 8/52 166/305.1 |
| 2015/0247082 A1 | 9/2015 | Rea | |
| 2015/0247381 A1 | 9/2015 | Pursley et al. | |
| 2015/0329767 A1 | 11/2015 | Vaughn et al. | |
| 2016/0003018 A1 | 1/2016 | Saboowala et al. | |
| 2016/0017204 A1 | 1/2016 | Hill et al. | |
| 2016/0024891 A1 | 1/2016 | Fursdon-Welsh et al. | |
| 2016/0032172 A1 | 2/2016 | Pursley et al. | |

FOREIGN PATENT DOCUMENTS

| | | | |
|---|---|---|---|
| CN | 103614128 A | 3/2014 | |
| CN | 103642477 A | 3/2014 | |
| EP | 0239770 | * 10/1987 | C23F 11/12 |
| EP | 1 051 237 B1 | 11/2003 | |
| EP | 1 378 554 A1 | 1/2004 | |
| EP | 1 786 879 B1 | 2/2012 | |
| EP | 2 195 400 B1 | 8/2012 | |
| EP | 1 880 081 B1 | 3/2013 | |
| WO | WO 1999/049182 A1 | 9/1999 | |
| WO | WO 2005/048706 A2 | 6/2005 | |
| WO | WO 2007/011475 A1 | 1/2007 | |
| WO | WO 2012/158645 A1 | 11/2012 | |

OTHER PUBLICATIONS

Adm, Evolution Chemicals E5789-117 Description. Jun. 2014.

Brost et al., Surfactants assist water-in-oil monitoring by fluroescence. World Oil. Oct. 2008;229(10):12 pages.

Champagne et al., Critical assessment of microemulsion technology for enhancing fluid recovery from tight gas formations and propped fractures. SPE European Formation Damage Conference. Noordwijk, The Netherlands. Jun. 7-10, 2011. SPE-144095. 10 pages.

Crafton et al., Micro-emulsion effectiveness for twenty four wells, eastern green river, wyoming. 2009 SPE Rocky Mountain Petroleum Technology Conference. Denver, Colorado, USA, Apr. 14-16, 2009. SPE-123280. 13 pages.

(56) References Cited

OTHER PUBLICATIONS

Haw, The HLB system: a time saving guide to surfactant selection. Presentation to the Midwest chapter of the society of cosmetic chemists. Uniqema. Mar. 9, 2004. 39 slides.

Howard et al., Comparison of flowback aids: understanding their capillary pressure and wetting properties. SPE Production & Operations. Aug. 2010;:376-87.

Kunieda et al. Evaluation of hydrophile-lipophile balance (HLB) of nonionic surfactants. J Colloid and Interface Sci. Sep. 1985;107(1):107-21.

Yang et al., Optimizing nanoemulsions as fluid flowback additives in enhancing tight gas production. J Petroleum Sci Eng. 2014;121:122-5.

Zelenev et al., Microemulsion technology for improved fluid recovery and enhanced core permeability to gas. 2009 SPE European Formation Damage Conference. Scheveningen, The Netherlands. May 27-29, 2009. SPE 122109. 13 pages.

Zelenev et al., Microemulsion-assisted fluid recovery and improved permeability to gas in shale formations. 2010 SPE International Symposium and Exhibition on Formation Damage Control. Lafayette, Louisiana, USA. Feb. 10-12, 2010. SPE 127922. 7 pages.

Zelenev, Surface energy of north American shales and its role in interaction of shale with surfactants and microemulsions. SPE International Symposium on Oilfield Chemistry. The Woodlands, Texas, USA. Apr. 11-13, 2011. SPE-141459. 7 pages.

BARABUF® Product Data Sheet;; Halliburton; www.halliburton.com/baroid; Sep. 3, 2010; p. 1.

\* cited by examiner

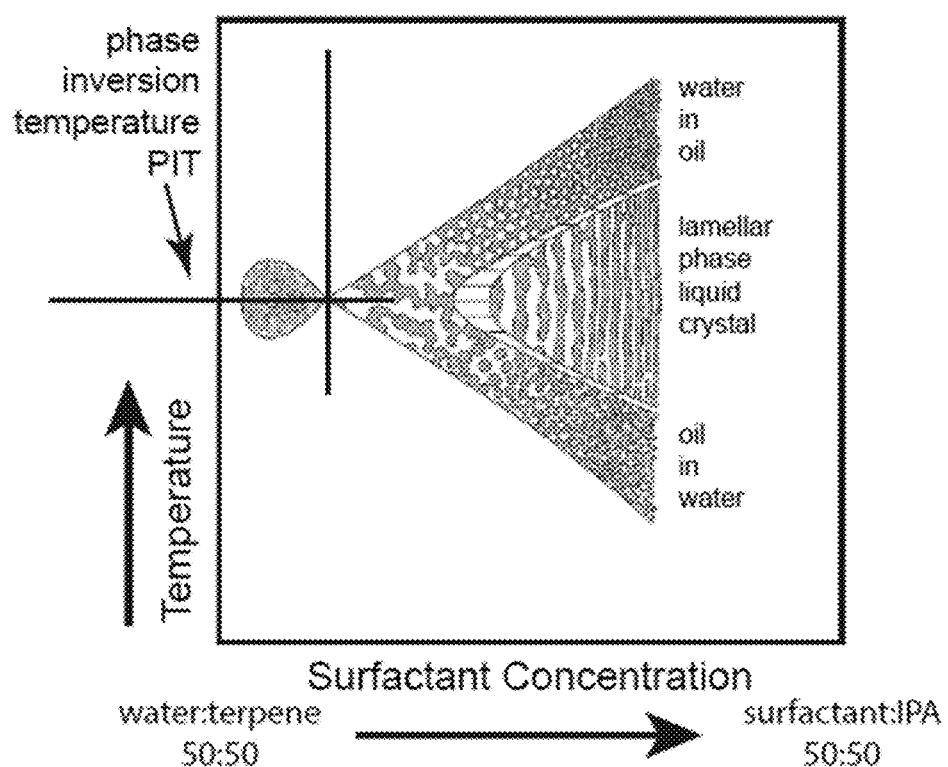

METHODS AND COMPOSITIONS RELATED TO GELLED LAYERS IN OIL AND/OR GAS WELLS

RELATED APPLICATIONS

This application claims priority to U.S. Provisional Application No. 62/030,049, filed Jul. 28, 2014 and U.S. Provisional Application No. 62/074,229, filed Nov. 3, 2014, which are incorporated herein by reference in their entirety.

FIELD OF INVENTION

Methods and compositions for the prevention of the formation, breakdown, and/or removal of gelled layers in an oil and/or gas well are provided.

BACKGROUND OF INVENTION

For many years, petroleum has been recovered from subterranean reservoirs through the use of drilled wells and production equipment. Oil and natural gas are found in, and produced from, porous and permeable subterranean formations, or reservoirs. The porosity and permeability of the formation determine its ability to store hydrocarbons, and the facility with which the hydrocarbons can be extracted from the formation. The incorporation of additives into fluids utilized in an oil and/or gas well can increase the recovery of crude oil or formation gas. For example, fracturing and acidizing are commonly used techniques to stimulate the production of oil and/or gas from reservoirs, wherein a fluid is injected into the wellbore and the formation (reservoir) to promote the recovery of oil and/or gas. However, when selecting or using a fluid to be utilized during the life cycle of an oil and/or gas well, it is important for the fluid to comprise the right combination of additives and components to achieve the necessary characteristics of the specific end-use application. The fluids utilized during the life cycle of an oil and/or gas well are often utilized to perform a number of tasks simultaneously and achieving necessary to optimal characteristics is not always easy.

In some cases, the fluids can cause unintended effects such as the formation of gelled layers (e.g., emulsions of oil and water, cross-linked gelled layers) which are difficult to prevent, breakdown and/or remove from the wellbore and/or which hinder the recovery of hydrocarbons from an oil and/or gas well. While several approaches have been used to overcome this problem, for example, the incorporation of gel-breaking agents, there is still the need for improved techniques, as well as a greater understanding as to how to select the additives to maximize the productivity of the well.

Accordingly, although a number of agents are known in the art, there is a continued need for more effective techniques for breaking down, and/or removing gelled layers and for increasing production of oil and/or gas.

SUMMARY OF INVENTION

Methods and compositions for the prevention of the formation, breakdown, and/or removal of gelled layers in an oil and/or gas well are provided.

In some embodiments, a method for preventing the formation of, breaking down, and/or removing a gelled layer in an oil and/or gas well having a wellbore comprises injecting a concentrate comprising one or more surfactants into the wellbore, wherein the surfactant comprises a sulfonate and/or a polyimine; and wherein the gelled layer is formed in the presence of an acid and an acid corrosion inhibitor. In some embodiments, a method for preventing the formation of, breaking down, and/or removing a gelled layer in an oil and/or gas well having a wellbore comprises injecting a concentrate comprising a first type of surfactant and a second type of surfactant into the wellbore, wherein the first type of surfactant comprises a sulfonate; wherein the second type of surfactant comprises a polyimine; and wherein the gelled layer is formed in the presence of an acid and an acid corrosion inhibitor.

In some embodiments, a method of preventing the formation of, breaking down, and/or removing a gelled layer in an oil and/or gas well having a wellbore comprises injecting an emulsion or microemulsion into the wellbore, wherein the emulsion or microemulsion comprises one or more surfactants, wherein the surfactant comprises a sulfonate and/or a polyimine; and wherein the gelled layer is formed in the presence of an acid and an acid corrosion inhibitor. In some embodiments, a method of preventing the formation of, breaking down, and/or removing a gelled layer in an oil and/or gas well having a wellbore comprises injecting an emulsion or microemulsion into the wellbore, wherein the emulsion or microemulsion comprises a first type of surfactant and a second type of surfactant; wherein the first type of surfactant comprises a sulfonate; wherein the second type of surfactant comprises a polyimine; and wherein the gelled layer is formed in the presence of an acid and an acid corrosion inhibitor.

In some embodiments, a method of preventing the formation of, breaking down, and/or removing a gelled layer in an oil and/or gas well having a wellbore comprises injecting a concentrate comprising a first type of surfactant and a second type of surfactant into the wellbore, wherein the first type of surfactant comprises an EO/PO block copolymer; wherein the second type of surfactant comprises an ethoxylated quaternary ammonium compound; and wherein the gelled layer comprises a crosslinked guar polymer, optionally partially broken.

In some embodiments, a method of preventing the formation of, breaking down, and/or removing a gelled layer in an oil and/or gas well having a wellbore comprises injecting an emulsion or microemulsion into the wellbore, wherein the emulsion or microemulsion comprises a first type of surfactant and a second type of surfactant; wherein the first type of surfactant comprises an EO/PO block copolymer; wherein the second type of surfactant comprises an ethoxylated quaternary ammonium compound; and wherein the gelled layer comprises a crosslinked guar polymer, optionally broken.

Other aspects, embodiments, and features of the methods and compositions will become apparent from the following detailed description when considered in conjunction with the accompanying drawings. All patent applications and patents incorporated herein by reference are incorporated by reference in their entirety. In case of conflict, the present specification, including definitions, will control.

BRIEF DESCRIPTION OF THE DRAWINGS

The accompanying drawings are not intended to be drawn to scale. For purposes of clarity, not every component may be labeled in every drawing. In the drawings:

FIG. 1 shows an exemplary plot for determining the phase inversion temperature of a microemulsion, according to some embodiments.

DETAILED DESCRIPTION

Methods and compositions for the prevention of the formation, breakdown, and/or removal of gelled layers in an oil and/or gas well are provided. In some embodiments, the compositions comprise a concentrate, as described in more detail herein. In some embodiments, the concentrate may comprise one or more surfactants and one or more additives. In some embodiments, the concentrate comprises two or more surfactants. In certain embodiments, the compositions comprise an emulsion or a microemulsion. The emulsion or microemulsion may include water, a surfactant, a solvent, and optionally a freezing point depression agent or other components. In some cases, a concentrate may be used to form an emulsion or a microemulsion. In some embodiments, the methods relate to the prevention of the formation, breakdown, and/or removal of a gelled layer in an oil and/or gas well by injecting a fluid comprising a concentrate or an emulsion or microemulsion into a wellbore.

As described herein, in some embodiments, the inventors have found that concentrates comprising certain surfactants prevent, increase the breakdown, and/or enable the removal of gelled layers as compared to other concentrates and/or in the absence of the concentrate under substantially similar conditions. In other embodiments, the inventors have found that emulsions or microemulsions comprising certain surfactants prevent, increase the breakdown, and/or enable the removal of gelled layers as compared to other emulsions or microemulsions and/or in the absence of the emulsion or microemulsion concentrate under substantially similar conditions. In some cases, increasing the breakdown of the gelled layer into smaller components and/or removal of the gelled layer allows the gelled layer to be more easily removed by flow from the wellbore, increasing oil and/or gas recovery, and/or other benefits described herein. In some cases, preventing the formation of a gelled layer increases oil and/or gas recovery. Laboratory tests may be conducted, as described herein, to determine the effectiveness of a concentrate and/or an emulsion or a microemulsion to prevent the formation of, breakdown, and/or remove a gelled layer.

Petroleum is generally recovered from subterranean reservoirs through the use of drilled wells and production equipment. Oil and natural gas are found in, and produced from, porous and permeable subterranean formations. A well drilled into a subterranean formation may penetrate formations containing liquid and/or gaseous hydrocarbons, as well as water (e.g., connate water). Based on techniques known in the art, wells are stimulated using various treatments (e.g., fracturing, acidizing) to improve the recovery of liquid and/or gaseous hydrocarbons. For example, additives may be added to wells during stimulation to improve the recovery of liquid and/or gaseous hydrocarbons. The process may involve suspending chemical agents in a fluid (e.g., comprising an acid and/or an acid corrosion inhibitor) and injecting the fluid down a wellbore. In some embodiments, the acid in the fluid is partially or completely consumed after reacting with carbonates in the reservoir. In some embodiments, fluids injected into a wellbore further include gelling agents (e.g., crosslinking agents) comprising boron (e.g., borate), zirconium (e.g., zirconate), titanium (e.g., titanate), aluminum, antimony, and/or chromium). Other gelling agents are also possible and will be known to one skilled in the art.

However, the use of such additives and/or techniques often leads to the formation of undesirable gelled layers which may form in oil and/or water layers within the well. The gelled layers may be formed, for example, during the stimulation and/or fracturing processes. The gelled layer may form in a non-aqueous phase (e.g., oil) and/or an aqueous phase (e.g., water) of a fluid in a well. In some cases, the gelled layer may form at the interface between the non-aqueous phase and the aqueous phase of a fluid in a well. The presence of gelled layers may reduce and/or slow the recovery of hydrocarbons from the well. Accordingly, prevention of the formation, breakdown, and/or removal of the gelled layers is desirable.

In some embodiments, the gelled layer is formed or present due to the presence of materials provided to the well. For example, the gelled layer may be formed via the use of viscosifiers and/or gelling agents, wherein the presence of the viscosifiers and/or gelling agents results in the formation of gelled layers at the interface between crude oil and an aqueous fluid. In some such embodiments, the gelled layer (e.g., gelled layers formed due to the presence of materials provided to the well) may comprise an emulsion (e.g., an emulsion of oil and/or water) and/or may be formed as a result of shear forces applied to mixtures of oil and aqueous phases (e.g., in the wellbore). The presence of shear forces typically utilized in a wellbore may further promote the formation of gelled layers at the interface between a non-aqueous phase and an aqueous phase of a fluid in a well. In some embodiments, a gelled layer may be present due to the formation of emulsions of crude oil and aqueous fluids present in the wellbore. Accordingly, in some embodiments, methods and compositions are provided for preventing or reducing the formation of gelled layers, wherein the gelled layer is generally formed due to the addition of one or more additives to a formation. For example, in some embodiments, a gelled layer is generally formed in the formation following addition of an additive to the formation. Addition of a composition (e.g., a concentrate or an emulsion or microemulsion as described herein), simultaneously and/or prior to the additive reduces or prevents the formation of the gelled layer as compared to the gelled layer formed in the absence of the composition under substantially similar conditions.

In other embodiments, a formed gelled layer is already present in the formation, and the formed gelled layer is reduced and/or removed by providing a composition as described herein (e.g., a concentrate or an emulsion or microemulsion) to the wellbore. For example, in some cases, the formation comprises a gelled layer. Addition of a composition to the formation reduces and/or breaks down the gelled layer as compared to the gelled layer present before addition of the composition. In some cases, the breakdown of gelled layers may include demulsification (e.g., the breakdown of emulsions present in the gelled layer). In certain embodiments, the prevention of gelled layers comprises non-emulsification (e.g., prevention of the formation of an emulsion that would otherwise be present in the gelled layer in the absence of a composition(s) as described herein).

As a first non-limiting example, during hydraulic fracturing procedures, polymers (e.g., guar including CMHPG (carboxymethyl hydroxypropyl guar gum), HPG (hydroxypropyl guar); xanthan) are often crosslinked (e.g., boron, zirconium, titanium, aluminum, antimony, chromium) to viscosify the fluid in the wellbore and/or increase the suspension of proppants (e.g., sand), thereby improving the resultant conductivity of the fractures. In some embodiments, following fracturing, a breaking additive (e.g., persulfate type, perchlorate type, enzyme (hemicellulose)) is then utilized to break the polymer chains which decreases the viscosity of the fluid in the wellbore, thereby increasing the fluid flowback. However, addition of the breaking additive may not result in a complete break of the polymer chains, and insoluble fragments of crosslinked polymer (e.g., partially broken crosslinked guar) may remain and form a gelled layer. In some embodiments, addition of a composition as described herein (e.g., comprising a concentrate or an emulsion or microemulsion) to the formation results in the breaking down and/or reduction of the gelled layer. Accordingly, in some embodiments, composition and methods for breaking down and/or reducing such gelled layers are provided, wherein the gelled layer comprises a crosslinked polymer (e.g., crosslinked guar polymer) and/or a partially broken crosslinked polymer (e.g., partially broken crosslinked guar polymer).

As a second non-limiting example, during acidizing operation wherein an acid and an acid corrosion inhibitor (e.g., comprising propargyl alcohol) are added to a well and high shear is applied, gelled layers may form (e.g., comprising an emulsion or microemulsion comprising the crude oil). In some embodiments, addition of a composition as described herein (e.g., comprising a concentrate or an emulsion or microemulsion) prevents the formation of a gelled layer that would generally form in the absence of the composition under substantially similar conditions. Accordingly, in some embodiments, composition and methods for preventing the formation of a gelled layer which would generally be formed in the presence of an acid and an acid corrosion inhibitor are provided. In other embodiments, addition of a composition as described herein (e.g., comprising a concentrate or an emulsion or microemulsion) to the formation results in the breaking down and/or reduction of the gelled layer formed in the presence of an acid and an acid corrosion inhibitor. Accordingly, in some embodiments, composition and methods for breaking down and/or reducing these gelled layers are provided, wherein the gelled layer was formed in the presence of an acid and an acid corrosion inhibitor.

In some embodiments, a gelled layer is formed due to the presence of a near-wellbore skin (e.g., fluid and solids naturally found in the reservoir which may block optimal flow into the wellbore). Non-limiting examples of skin materials include paraffin, asphaltene, drilling mud components (e.g., barite, clays), non-mobile oil in place, gelled layers (e.g., comprising partially broken guar crosslinked with borate and/or oil and water emulsions), and fines (e.g., which may block pores in the reservoir material).

Incorporation of a concentrate (e.g., comprising two or more surfactants) and/or an emulsion or microemulsion as described herein (e.g., comprising one or more surfactants and optionally a solvent) can aid in the prevention, reduction, and/or removal of gelled layers. In some embodiments, the inventors have found that addition of a concentrate or an emulsion or microemulsion comprising one or more select surfactants prevents the formation of gelled layers (e.g., which would generally form in the absence of the concentrate and/or emulsion or microemulsion) and/or increases the breakdown of gelled layers (e.g., comprising paraffin and/or asphaltene) formed in a wellbore fluid comprising certain acid corrosion inhibitors (e.g., comprising propargyl alcohol) as compared to other surfactants under substantially similar circumstances. In certain embodiments, the inventors have found that the addition of a concentrate or an emulsion or microemulsion comprising one or more select surfactants prevents the formation of gelled layers (e.g., which would generally form in the absence of the concentrate and/or emulsion or microemulsion) and/or increases the breakdown of gelled layers comprising a crosslinked polymer (e.g., comprising crosslinked guar) formed in a wellbore fluid, optionally broken following exposure to a breaking additive (e.g., ammonium persulfate).

As will be understood by those of ordinary skill in the art, the composition of the concentrate and/or the emulsion or microemulsion will vary depending on the type of gelled layer that is targeted for prevention of the formation, breakdown, and/or removal. Those of ordinary skill in the art will be able to select and utilize the concentrates and/or the emulsions or microemulsions described herein to prevent the formation of, increase the breakdown of, and/or removal of the gelled layer as compared to methods which do not utilize a concentrate and/or an emulsion or microemulsion. Some non-limiting specific embodiments will now be described in detail.

In a first non-limiting embodiment, the gelled layers may be formed in the presence of and/or be caused by addition of an acid and an acid corrosion inhibitor to a formation. In some embodiments, a method of breaking down and/or reducing a gelled layer comprises injecting a concentrate and/or emulsion or microemulsion into a wellbore comprising the gelled layer. In some embodiments, a method of preventing a gelled layer which would typically form in the presence of an acid and an acid corrosion inhibitor comprises injecting a concentrate or an emulsion or microemulsion comprising a first type of surfactant and a second type of surfactant into the wellbore prior to and/or sequentially with an acid and an acid corrosion inhibitor, wherein the gelled layer is reduced as compared to the gelled layer which forms under substantially similar conditions following injection of the acid and the acid corrosion inhibitor but not the concentrate or the emulsion or microemulsion. In some embodiments, addition of the concentrate and/or emulsion or microemulsion results in partial or complete prevention of the formation, breakdown, and/or removal of the gelled layer. In some embodiments, the acid is HCl. Other suitable acids are described herein. The term "partial" generally refers to a decrease in an amount (e.g., a weight percentage) of a gelled layer formed or present after the addition of a concentrate and/or emulsion or microemulsion as described herein as compared to the amount (e.g., the weight percentage) of the gelled layer formed or present in the absence of the concentrate and/or emulsion or microemulsion. Suitable tests for determining partial and/or complete prevention, breakdown, and/or removal are described in more detail below.

In some embodiments, the acid corrosion inhibitor comprises propargyl alcohol. Other acid corrosion inhibitors are described herein.

In some embodiments, the concentrate and/or emulsion or microemulsion comprises one or more surfactants. In some embodiments, the concentrate and/or emulsion or microemulsion comprises a first type of a surfactant and a second type of surfactant. In some embodiments, the first surfactant comprises a sulfonate and the second surfactant comprises a polyimine. In certain embodiments, the sulfonate is a dodecyl benzene sulfonic acid and the polyimine is an alkoxylated polyimine. Additional details regarding these surfactants are described herein. In certain embodiments, the first type of surfactant and/or the second type of surfactant are present in the concentrate in an amount between about 1 wt % and about 100 wt %, between about 1 wt % and about 60 wt %, between about 20 wt % and about 50 wt %, or between about 20 wt % and about 30 wt % versus the total concentrate. In some embodiments, the amount of the first type of surfactant and the amount of the second type of surfactant versus the total concentrate may be the same or different (e.g., the first type of surfactant is present in the concentrate in an amount between about 1 wt % and about 30 wt % and the second type of surfactant is present in the concentrate in an amount between about 1 wt % and about 30 wt % versus the total concentrate). In some embodiments, the first type of surfactant and the second type of surfactant are present in the concentrate and/or emulsion or microemulsion in equal amounts.

In some embodiments, the concentrate may be diluted with a first type of dilution fluid prior to and/or during addition to the wellbore to form a concentrate solution. The concentrate solution and/or emulsion or microemulsion may be further diluted (e.g. with a second type of dilution fluid) prior to and/or during addition to the well. The first type of dilution fluid and the second type of dilution fluid may be the same or different. In some embodiments, the first type of dilution fluid and/or the second type of dilution fluid may comprise an acid and an acid corrosion inhibitor. In some embodiments, the concentrate solution comprises between about 1 wt % and about 90 wt % aqueous phase, between about 1 wt % and about 60 wt % two or more surfactants (e.g., a first surfactant comprising a sulfonate and a second surfactant comprising a polyimine), between about 0 wt % and about 80 wt % freezing point depression agent, and between about 1 wt % and about 60 wt % base versus the total concentrate solution. In another embodiment, the concentrate solution comprises between about 20 wt % and about 60 wt % aqueous phase, between about 20 wt % and about 50 wt % two or more surfactants, between about 0 wt % and about 30 wt % freezing point depression agent, and between about 1 wt % and about 30 wt % base versus the total concentrate solution. In yet another embodiment, the concentrate solution may comprise between about 45 wt % and about 55 wt % aqueous phase, between about 20 wt % and about 30 wt % two or more surfactants, between about 10 wt % and about 15 wt % freezing point depression agent, and between about 1 wt % and about 10 wt % base versus the total concentrate solution. In some embodiments, the concentrate or concentrate solution does not form or comprise an emulsion or a microemulsion. In certain embodiments, the freezing point depression agent comprises glycol (e.g., propylene glycol). In some embodiments, the base is sodium hydroxide or potassium hydroxide.

In some embodiments, an emulsion or microemulsion is injected into the wellbore. In some embodiments, the emulsion or microemulsion may be diluted with a dilution fluid prior to and/or during addition to the wellbore. In some embodiments, the emulsion or microemulsion comprises the concentrate (e.g., comprising one or more surfactants, or two or more surfactants), a non-aqueous phase, an aqueous phase, and optionally other additives. Methods for forming emulsions or microemulsions are described herein. In some embodiments, the emulsion or microemulsion comprises between about 1 wt % and about 60 wt % the first type of surfactant, between about 1 wt % and about 60 wt % the second type of surfactant, between about 1 wt % and about 60 wt % solvent (e.g., a terpene), between about 1 wt % and about 90 wt % water, and between about 0 wt % and about 80 wt % a freezing point depression agent versus the total emulsion or microemulsion composition. In some embodiments, the emulsion or microemulsion comprises between about 20 wt % and about 50 wt % the first type of surfactant, between about 20 wt % and about 50 wt % the second type of surfactant, between about 1 wt % and about 30 wt % solvent (e.g., a terpene), between about 20 wt % and about 60 wt % water, and between about 0 wt % and about 30 wt % a freezing point depression agent versus the total emulsion or microemulsion composition. In certain embodiments, the emulsion or microemulsion comprises between about 10 wt % and about 20 wt % the first type of surfactant (e.g., a sulfonate), between about 10 wt % and about 20 wt % the second type of surfactant (e.g., a polyimine), between about 10 wt % and about 20 wt % a freezing point depression agent (e.g., a glycol), between about 35 wt % and about 45 wt % water, and between about 1 wt % and about 10 wt % solvent (e.g., a terpene) versus the total emulsion or microemulsion composition.

In some embodiments, the solvent is a terpene. In certain embodiments, the emulsion or microemulsion is added to a dilution fluid in an amount between about 0.5 gpt and about 2.0 gpt of the dilution fluid. In certain embodiments, the dilution fluid comprises an acid and an acid corrosion inhibitor. In some cases, the acid comprises hydrochloric acid. In certain embodiments, the acid corrosion inhibitor comprises propargyl alcohol. Details of the components of the emulsions or microemulsions and dilution fluids are described in detail herein.

In a second non-limiting specific embodiment, the gelled layers may comprise crosslinked guar polymer, optionally partially broken. The term guar polymer should be understood to encompass a wide variety of guar polymers including, but not limited to, guar gum, carboxymethyl hydropropyl guar gum (CMHPG), hydroxypropyl guar (HPG), and hydroxypropyl-methyl guar (MHPG), and combinations thereof. In some embodiments, the crosslinked guar polymer may be formed by addition of a guar polymer and a crosslinking agent (e.g., a gelling agent) to a wellbore. In some such embodiments, the guar polymer may be crosslinked prior to the addition to the wellbore. The crosslinked guar polymer may then be broken by addition of a breaking additive (e.g., a persulfate such as ammonium persulfate). The breaking additive may be added to the wellbore prior to and/or simultaneously to the addition of the concentrate and/or emulsion or microemulsion. In some embodiments, the concentrate and/or emulsion or microemulsion comprises the breaking additive. Alternatively, in some embodiments, the breaking additive is present in a dilution fluid. In some embodiments, the method comprises injecting a concentrate (or a concentrate solution) and/or an emulsion or microemulsion into the wellbore either prior to the formation of the gelled layer (e.g., for prevention of the formation of a gelled layer), or after the formation of the gelled layer (e.g., for breakdown and/or removal of the gelled layer). In some embodiments, the concentrate and/or emulsion or microemulsion results in partial or complete prevention of the gelled layer.

In some embodiments, the concentrate and/or the emulsion or microemulsion comprises a first type of surfactant and a second type of surfactant. In some embodiments, the first type of surfactant comprises an ethylene oxide/propylene oxide copolymer ("EO/PO" copolymer) and the second type of surfactant comprises an ethoxylated quaternary ammonium compound. Additional details regarding these surfactants are described herein. In certain embodiments, the first type of surfactant and/or the second type of surfactant may be present in the concentrate in an amount between about 1 wt % and about 100 wt %, between about 1 wt % and about 60 wt %, between about 20 wt % and about 50 wt %, or between about 20 wt % and about 30 wt % versus the total concentrate. In some embodiments, the amount of the first type of surfactant and the amount of the second type of surfactant versus the total concentrate may be the same or different (e.g., the first type of surfactant is present in the concentrate in an amount between about 1 wt % and about 30 wt % and the second type of surfactant is present in the concentrate in an amount between about 1 wt % and about 30 wt % versus the total concentrate). In certain embodiments, the first surfactant and the second surfactant are present in equal amounts.

In some embodiments, the concentrate may be diluted with a first type of dilution fluid prior to and/or during addition to the well to form a concentrate solution. The concentrate solution may be further diluted (e.g., with a second type of dilution fluid) prior to and/or during addition to the well with a dilution fluid. In certain embodiments, the first type of dilution fluid and the second type of dilution fluid are the same or different. In some embodiments, the concentrate solution comprises between about 1 wt % and about 90 wt % aqueous phase, between about 1 wt % and about 60 wt % two or more surfactants (e.g., an ethylene oxide/propylene oxide copolymer and an ethoxylated quaternary ammonium), and between about 0 wt % and about 80 wt % freezing point depression agent, versus the total concentrate solution. In another embodiment, the concentrate solution comprises between about 20 wt % and about 60 wt % aqueous phase, between about 20 wt % and about 50 wt % two or more surfactants, and between about 0 wt % and about 30 wt % freezing point depression agent versus the total concentrate solution. In yet another embodiment, the concentrate solution may comprise between about 45 wt % and about 55 wt % aqueous phase, between about 20 wt % and about 30 wt % two or more surfactants, and between about 10 wt % and about 15 wt % freezing point depression agent, versus the total concentrate solution. In some embodiments, the concentrate or concentrate solution does not form or comprise an emulsion or a microemulsion. In some embodiments, an emulsion or microemulsion is injected into the wellbore. In some embodiments, the emulsion or microemulsion may be diluted with a dilution fluid prior to and/or during addition to the wellbore. In some embodiments, the emulsion or microemulsion comprises the concentrate (e.g., comprising two or more surfactants), a non-aqueous phase, an aqueous phase, and optionally other additives. In some embodiments, an emulsion or microemulsion can be formed during the injection of the emulsion or microemulsion components into the wellbore. Methods for forming emulsions or microemulsions are described herein. In some embodiments, the emulsion or microemulsion comprises between about 1 wt % and about 60 wt % the first type of surfactant, between about 1 wt % and about 60 wt % the second type of surfactant, between about 1 wt % and about 60 wt % solvent (e.g., a terpene), between about 1 wt % and about 90 wt % water, and between about 0 wt % and about 80 wt % a freezing point depression agent versus the total emulsion or microemulsion composition. In some embodiments, the emulsion or microemulsion comprises between about 20 wt % and about 50 wt % the first type of surfactant, between about 20 wt % and about 50 wt % the second type of surfactant, between about 1 wt % and about 30 wt % solvent (e.g., a terpene), between about 20 wt % and about 60 wt % water, and between about 0 wt % and about 30 wt % a freezing point depression agent versus the total emulsion or microemulsion composition. In certain embodiments, the emulsion or microemulsion comprises between about 10 wt % and about 20 wt % the first type of surfactant (e.g., an ethylene oxide/propylene oxide copolymer), between about 10 wt % and about 20 wt % the second type of surfactant (e.g., an ethoxylated quaternary ammonium), between about 10 wt % and about 20 wt % a freezing point depression agent (e.g., a glycol), between about 35 wt % and about 45 wt % water, and between about 1 wt % and about 10 wt % solvent (e.g., a terpene) versus the total emulsion or microemulsion composition.

In some embodiments, the solvent is a terpene. In certain embodiments, the emulsion or microemulsion is added to a dilution fluid in an amount between about 0.5 gpt and about 2.0 gpt of the dilution fluid. In certain embodiments, the dilution fluid comprises a polymer, a crosslinker, and/or a breaking additive. In some cases, the polymer comprises guar. In certain embodiments, the crosslinker comprises borate. In some embodiments, the breaking additive is ammonium persulfate. Details of the components of the emulsions or microemulsions and dilution fluids are described in detail herein.

In some embodiments, the solvent (e.g., the terpene) is selected based upon its phase inversion temperature (PIT), as described herein. The PIT of a solvent may be between about −10° C. and about 80° C. For example, the PIT of the solvent may be less than or equal to about 80° C., less than or equal to about 60° C., less than or equal to about 40° C., less than or equal to about 30° C., less than or equal to about 20° C., less than or equal to about 10° C., or less than or equal to about 0° C. Those of ordinary skill in the art will be aware of methods for determining the PIT for an emulsion or microemulsion comprising a solvent (e.g., a terpene). In some embodiments, emulsions or microemulsions comprising solvents with a PIT less than or equal to about 40° C., or less than or equal to 10° C. show prevention of the formation, increased breakdown, and/or removal of gelled layers as compared to emulsions or microemulsions comprising solvents with a higher PIT.

In some embodiments, compositions for the prevention of the formation, breakdown, and/or removal of a gelled layer are provided. In certain embodiments, the composition comprises a concentrate. As used herein, the term concentrate refers to a composition comprising primarily of one or more surfactants. In some embodiments, the concentrate refers to a composition comprising primarily two or more surfactants. For example, a concentrate may comprise between about 50 wt % and about 100 wt %, or between about 60 wt % and about 100 wt %, or between about 70 wt % and about 100 wt %, or between about 80 wt % and about 100 wt % of the two or more surfactants versus the total concentrate composition. In other embodiments, however, the concentrate may comprise less, and comprise other components or additives. Non-limiting examples of additives are described herein in connection with emulsion or microemulsion and/or dilutions fluids. In some embodiments, the concentrate does not comprise an aqueous phase. In some embodiments, the concentrate does not comprise water. In some embodiments, the concentrate does not comprise a solvent. However, in other embodiments, the concentrate may comprise a solvent. In some embodiments, the concentrate comprises a first type of surfactant and a second type of surfactant. In some embodiments, a concentrate comprises at least one surfactant and optionally other components (e.g., an additive). In some embodiments, prior to and/or during addition of the concentrate to the wellbore, the concentrate may be further diluted with a dilution fluid.

In one embodiment, the concentrate comprises a polyimine and a sulfonate. In another embodiment, the concentrate comprises an ethylene oxide/propylene oxide (EO/PO) block copolymer and/or an ethoxylated quaternary ammonium compound.

In some embodiments, the concentrate may be diluted with a first type of dilution fluid to form a concentrate solution. For example, in some embodiments, the concentrate may be diluted with a first type of dilution fluid comprising water, a freezing point depression agent, and optionally one or more additives. Freezing point depression agents and other additives are described in detail herein. In some embodiments, prior to and/or during addition of the concentrate solution to the wellbore, the concentrate solution may be further diluted with a second type of dilution fluid. The first type of dilution fluid and the second type of dilution fluid may be the same or different.

In certain embodiments, the addition of a concentrate (or concentrate solution) to a dilution fluid does not form an emulsion or a microemulsion. However, in other embodiments, the addition of the concentrate (or concentrate solution) to a dilution fluid forms an emulsion or microemulsion. In certain embodiments, the mixing of a concentrate and/or dilution fluid forms an emulsion or microemulsion.

In some embodiments, fluids comprising emulsions or microemulsions for the prevention of the formation, breakdown, and/or removal of gelled layers are provided.

The terms should be understood to include emulsions or microemulsions that have a water continuous phase, or that have an oil continuous phase, or microemulsions that are bicontinuous or multiple continuous phases of water and oil.

As used herein, the term emulsion is given its ordinary meaning in the art and refers to dispersions of one immiscible liquid in another, in the form of droplets, with diameters approximately in the range of 100-1,000 nanometers. Emulsions may be thermodynamically unstable and/or require high shear forces to induce their formation.

As used herein, the term microemulsion is given its ordinary meaning in the art and refers to dispersions of one immiscible liquid in another, in the form of droplets, with diameters approximately in the range of about between about 1 and about 1000 nm, or between 10 and about 1000 nanometers, or between about 10 and about 500 nm, or between about 10 and about 300 nm, or between about 10 and about 100 nm. Microemulsions are clear or transparent because they contain particles smaller than the wavelength of visible light. In addition, microemulsions are homogeneous thermodynamically stable single phases, and form spontaneously, and thus, differ markedly from thermodynamically unstable emulsions, which generally depend upon intense mixing energy for their formation. Microemulsions may be characterized by a variety of advantageous properties including, by not limited to, (i) clarity, (ii) very small particle size, (iii) ultra-low interfacial tensions, (iv) the ability to combine properties of water and oil in a single homogeneous fluid, (v) shelf life stability, and (vi) ease of preparation.

In some embodiments, the microemulsions described herein are stabilized microemulsions that are formed by the combination of a solvent-surfactant blend with an appropriate oil-based or water-based carrier fluid. In certain embodiments, the microemulsions described herein are microemulsions that are formed by the combination of a concentrate with a dilution fluid.

Generally, the microemulsion forms upon simple mixing of the components without the need for high shearing generally required in the formation of ordinary emulsions. In some embodiments, the microemulsion is a thermodynamically stable system, and the droplets remain finely dispersed over time. In some cases, the average droplet size ranges from about 10 nm to about 300 nm.

It should be understood, that while much of the description herein focuses on microemulsions, this is by no means limiting, and emulsions may be employed where appropriate.

In some embodiments, the emulsion or microemulsion is a single emulsion or microemulsion. For example, the emulsion or microemulsion comprises a single layer of a surfactant. In other embodiments, the emulsion or microemulsion may be a double or multilamellar emulsion or microemulsion. For example, the emulsion or microemulsion comprises two or more layers of a surfactant. In some embodiments, the emulsion or microemulsion comprises a single layer of surfactant surrounding a core (e.g., one or more of water, oil, solvent, and/or other additives) or a multiple layers of surfactant (e.g., two or more concentric layers surrounding the core). In certain embodiments, the emulsion or microemulsion comprises two or more immiscible cores (e.g., one or more of water, oil, solvent, and/or other additives which have equal or about equal affinities for the surfactant).

In some embodiments, a microemulsion comprises a solvent and a surfactant. In some embodiments, the microemulsion further comprises additional components, for example, a freezing point depression agent. Details of each of the components of the microemulsions are described in detail herein. In some embodiments, the components of the microemulsions are selected so as to reduce or remove the hazards of the microemulsion to the environment and/or the subterranean reservoirs. In certain embodiments, the components of the microemulsions are selected so as to prevent the formation of, breakdown and/or remove gelled layers in a wellbore.

In some embodiments, the emulsion or microemulsion comprises between about 1 wt % and 95 wt % water, between about 1 wt % and 99 wt % solvent, between about 0 wt % and about 50 wt % alcohol, between about 1 wt % and 90 wt % surfactant, and between about 0 wt % and about 70 wt % freezing point depression agent, and between about 0 wt % and about 70 wt % other additives, versus the total microemulsion composition. In some embodiments, the emulsion or microemulsion comprises between about 1 wt % and 60 wt % water, between about 1 wt % and 30 wt % solvent, between about 1 wt % and about 50 wt % alcohol, between about 5 wt % and 65 wt % surfactant, and between about 0 wt % and about 25 wt % freezing point depression agent, and between about 0 wt % and about 30 wt % other additives, versus the total microemulsion composition. In some embodiments, for the formulations above, the water is present in an amount between about 10 wt % and about 55 wt %, or between about 15 wt % and about 45 wt %. In some embodiments, for the formulations above, the solvent is present in an amount between about 2 wt % and about 25 wt %, or between about 5 wt % and about 25 wt %. In some embodiments, the solvent comprises a terpene. In some embodiments, for the formulations above, the alcohol is present in an amount between about 5 wt % and about 40 wt %, or between about 5 wt % and 35 wt %. In some embodiments, the alcohol comprises isopropanol. In some embodiments, for the formulations above, the surfactant is present in an amount between about 5 wt % and 60 wt %, or between about 10 wt % and 55 wt %. In some embodiments, for the formulations above, the freezing point depression agent is present in an amount between about 1 wt % and about 25 wt %, or between about 1 wt % and about 20 wt %, or between about 3 wt % and about 20 wt %. In some embodiments, for the formulations above, the other additives are present in an amount between about 1 wt % and about 30 wt %, or between about 1 wt % and about 25 wt %, or between about 1 wt % and about 20 wt %. In some embodiments, the other additives comprise one or more salts and/or one or more acids.

In some embodiments, a microemulsion composition comprises between about 5 wt % to about 60 wt % water, from about 2 wt % to about 50 wt % solvent, from about 5 wt % to about 60 wt % of a first type of a solubilizing surfactant, from about 2 wt % to about 50 wt % of alcohol, from about 0.5 to 30 wt % of a freezing point depression agent, from about 0.5 wt % to about 30 wt % of a second type of surfactant, from about 0 wt % to about 70 wt % of other additives (e.g., acid), and from about 0.5 wt % to about 30% of mutual solvent, which is miscible together with the water and the solvent. In some embodiments, the solvent is a substance with a significant hydrophobic character with linear, branched, cyclic, bicyclic, saturated or unsaturated structure, including but not limited to terpenes, terpineols, terpene alcohols, aldehydes, ketones, esters, amines, and amides. Non-limiting examples of suitable mutual solvents include ethyleneglycolmonobutyl ether (EGMBE), dipropylene glycol monomethyl ether, short chain alcohols (e.g., isopropanol), tetrahydrofuran, dioxane, dimethylformamide, and dimethylsulfoxide. Additional solvents are described in more detail below.

In some embodiments, the emulsion or microemulsion comprising a solvent (e.g., d-limonene, alpha-terpineol, alpha-pinene, gamma-terpinene, nopol, xylene, octane, octanol), one or more surfactants (e.g., an EO/PO block co-polymer, an ethoxylated quaternary ammonium compound, a polyimine, a sulfonate, or combinations thereof), optionally one or more additives (e.g., a freezing point depression agent), and an aqueous phase (e.g., water) as described herein is added to a stimulation fluid before, during, and/or after injection of the dilution fluid into a wellbore to aid in the prevention, breakdown, and/or removal of the gelled layer. The inventors unexpectedly discovered that the addition of an emulsion or microemulsion comprising an EO/PO block co-polymer and an ethoxylated quaternary ammonium compound to gelled layer (e.g., optionally comprising a viscosifier, a cross-linking agent, and/or a breaking additive) was effective at removing all or substantially all of the formed gelled layers (e.g., formed by the presence of guar cross-linked with borate).

In some embodiments, the aqueous phase in the emulsion or microemulsion used to aid the prevention, breakdown, and/or removal of a gelled layer is present in an amount between about 1 wt % and about 90 wt % (e.g., between about 20 wt % and about 60 wt %, or between about 35 wt % and about 45 wt %). In certain embodiments, the surfactant (e.g., an EO/PO block co-polymer, an ethoxylated quaternary ammonium compound, a polyimine, a sulfonate, or combinations thereof) in the emulsion or microemulsion used to aid the prevention, breakdown, and/or removal of a gelled layer is present in an amount between about 1 wt % and about 60 wt % (e.g., between about 20 wt % to about 50 wt %, or between about 10 wt % to about 20 wt %). In some embodiments, the optional additives (e.g., a freezing point depression agent) in the emulsion or microemulsion used to aid the prevention, breakdown, and/or removal of a gelled layer is present in an amount between about 0 wt % and about 80 wt % (e.g., between about 0 wt % and about 30 w %, or between about 10 wt % and about 20 wt %). In some embodiments, the solvent (e.g., d-limonene, alpha-terpineol, alpha-pinene, gamma-terpinene, nopol, xylene, octane, octanol) in the emulsion or microemulsion used to aid the prevention, breakdown, and/or removal of a gelled layer is present in an amount between about 1 wt % and about 60 wt % (e.g., between about 1 wt % and about 30 wt %, or between about 1 wt % and about 10 wt %).

In some embodiments, the emulsion or microemulsion is as described in U.S. Pat. No. 7,380,606 and entitled "Composition and Process for Well Cleaning," herein incorporated by reference.

In some embodiments, the components of the microemulsion and/or the amounts of the components are selected such that the microemulsion is stable over a wide range of temperatures. For example, the microemulsion may exhibit stability between about 40° F. and about 400° F., or between about 40° F. and about 300° F. or between about 40° F. and about 150° F. Those of ordinary skill in the art will be aware of methods and techniques for determining the range of stability of the microemulsion. For example, the lower boundary may be determined by the freezing point and the upper boundary may be determined by the cloud point and/or using spectroscopy methods. Stability over a wide range of temperatures may be important in embodiments where the microemulsions are being employed in applications comprising environments wherein the temperature may vary significantly, or may have extreme highs (e.g., desert) or lows (e.g., Arctic).

The microemulsions described herein may be formed using methods known to those of ordinary skill in the art. In some embodiments, the aqueous and non-aqueous phases may be combined (e.g., the water and the solvent(s)), followed by addition of a surfactant(s) and optionally one or more additives (e.g., freezing point depression agent(s)), and agitating the combination. The strength, type, and length of the agitation may be varied as known in the art depending on various factors including the components of the microemulsion, the quantity of the microemulsion, and the resulting type of microemulsion formed. For example, for small samples, a few seconds of gentle mixing can yield a microemulsion, whereas for larger samples, longer agitation times and/or stronger agitation may be required. Agitation may be provided by any suitable source, for example, a vortex mixer, a stirrer (e.g., magnetic stirrer), etc.

In some embodiments, the concentrate or the microemulsion comprises a surfactant.

The concentrate or the microemulsion may comprise a single surfactant or a combination of two or more surfactants. For example, in some embodiments, the surfactant comprises a first type of surfactant and a second type of surfactant. The term surfactant, as used herein, is given its ordinary meaning in the art and refers to compounds having an amphiphilic structure which gives them a specific affinity for oil/water-type and water/oil-type interfaces which helps the compounds to reduce the free energy of these interfaces. In some cases, surfactants can be used to form microemulsions in which they stabilize the dispersed phase of a microemulsion. The term surfactant encompasses cationic surfactants, anionic surfactants, amphoteric surfactants, nonionic surfactants, zwitterionic surfactants, and mixtures thereof. In some embodiments, the surfactant is a nonionic surfactant. Nonionic surfactants generally do not contain any charges. Amphoteric surfactants generally have both positive and negative charges, however, the net charge of the surfactant can be positive, negative, or neutral, depending on the pH of the solution. Anionic surfactants generally possess a net negative charge. Cationic surfactants generally possess a net positive charge. Zwitterionic surfactants are generally not pH dependent. A zwitterion is a neutral molecule with a positive and a negative electrical charge, though multiple positive and negative charges can be present. Zwitterions are distinct from dipole, at different locations within that molecule.

The term surface energy, as used herein, is given its ordinary meaning in the art and refers to the extent of disruption of intermolecular bonds that occur when the surface is created (e.g., the energy excess associated with the surface as compared to the bulk). Generally, surface energy is also referred to as surface tension (e.g., for liquid-gas interfaces) or interfacial tension (e.g., for liquid-liquid interfaces). As will be understood by those skilled in the art, surfactants generally orient themselves across the interface to minimize the extent of disruption of intermolecular bonds (i.e. lower the surface energy). Typically, a surfactant at an interface between polar and non-polar phases orient themselves at the interface such that the difference in polarity is minimized.

Those of ordinary skill in the art will be aware of methods and techniques for selecting surfactants for use in the concentrate or the microemulsions described herein. In some cases, the surfactant(s) are matched to and/or optimized for the particular oil or solvent in use. In some embodiments, the surfactant(s) are selected by mapping the phase behavior of the microemulsion and choosing the surfactant(s) that gives the desired range of phase behavior. In some cases, the stability of the concentrate or the microemulsion over a wide range of temperatures is targeted as the concentrate or the microemulsion may be subject to a wide range of temperatures due to the environmental conditions present at the subterranean formation and/or reservoir.

Each surfactant may be individually present in the concentrate or the microemulsion in any suitable amount. In some embodiments, the surfactant is present in an amount between about 0 wt % and about 99 wt %, or between about 1 wt % and about 90 wt %, or between about 0 wt % and about 60 wt %, or between about 1 wt % and about 60 wt %, or between about 5 wt % and about 60 wt %, or between about 10 wt % and about 60 wt %, or between about 5 wt % and about 65 wt %, or between about 5 wt % and about 55 wt %, or between about 10 wt % and about 55 wt %, or between about 2 wt % and about 50 wt %, or between about 0 wt % and about 40 wt %, or between about 15 wt % and about 55 wt %, or between about 20 wt % and about 50 wt %, versus the total concentrate or microemulsion composition.

Suitable surfactants for use with the compositions and methods described herein will be known in the art.

Non-limiting examples of surfactants include nonionic surfactants with linear or branched structure, including, but not limited to, ethoxylated fatty alcohols, ethoxylated castor oils, alkyl glucosides, cationic surfactants with a medium chain length, linear or branched anionic surfactants, amine oxides, amphoteric surfactants, silicone based surfactants, alkoxylated novolac resins (e.g. alkoxylated phenolic resins), alkoxylated polyimines, alkoxylated polyamines, and fluorosurfactants. In some embodiments, the surfactant is an amphiphilic block copolymer where one block is hydrophobic and one block is hydrophilic. In some cases, the total molecular weight of the polymer is greater than 5000 daltons. The hydrophilic block of these polymers can be nonionic, anionic, cationic, amphoteric, or zwitterionic.

In some embodiments, the surfactant is an ethylene oxide/propylene oxide (EO/PO) copolymer. In some embodiments, the ethylene oxide/propylene oxide (EO/PO) copolymer is an ethylene oxide/propylene oxide (EO/PO) block copolymer. In some embodiments, the ethylene oxide/propylene oxide (EO/PO) block copolymer comprises the structure. $R^3[(EO)_q(PO)_r]_5R^3$, wherein EO is ethylene oxide, PO is propylene oxide, each q, r, and s are independent between 1-10,000, and each $R^3$ is the same or different and is an end group (e.g., hydrogen, optionally substituted alkyl, etc). Generally, q, r, and s are selected so as to give the polymer a hydrophilic-lipophilic balance number (HLB) between about 5 and about 25 (e.g., between about 5 and about 15). The PO may have any suitable average molecular weight. In some embodiments, the average molecular weight of the PO may range between about 1000 g/mol and about 3500 g/mol (e.g., between about 1750 g/mol and about 3250 g/mol).

In some embodiments, the weight percentage of present in the EO/PO copolymer is between about 10 wt % and about 40 wt % versus the total weight of the EO/PO copolymer. For example, in some embodiments, the weight percentage of EO present in the EO/PO copolymer is at least about 10 wt %, at least about 20 wt %, or at least about 30 wt % versus the total weight of the EO/PO copolymer. In certain embodiments, the weight percentage of EO present in the EO/PO copolymer is less than or equal to about 40 wt %, less than or equal to about 30 wt %, or less than or equal to about 20 wt % versus the total weight of the EO/PO copolymer. Combinations of the above-referenced ranges are also possible.

The ethylene oxide/propylene oxide (EO/PO) copolymer may be purchased from a commercial source. Non-limiting examples of commercially available ethylene oxide/propylene oxide (EO/PO) copolymers include ANTAROX® P-104, PLURONIC® L64, or SURFONIC® PO/\-L101 having 2-250 EO or PO units (e.g., or 2-200, or 2-150, or 2-100, or 2-50, or 2-40).

In some embodiments, the surfactant is an ethoxylated quaternary ammonium compound. In some embodiments, the ethoxylated quaternary ammonium compound has the structure $[NR^4R^5]^+[X]^-$, wherein each $R^4$ and $R^5$ is the same or different and is optionally substituted alkyl, ethoxyl, propoxyl, or butyloxyl, $R^4$ is $—(CH_2CH_2O)_n$, and n is 1-20. In some embodiments, n is 1-15, or 1-10, and $[X]^-$ is a counter anion. In some embodiments, each $R^4$ and $R^5$ is an optionally substituted alkyl. In certain embodiments, the ethoxylated quaternary ammonium compound has the structure $[NR'R''R_2]^+[X]^-$ where each R is the same or different and is alkyl, optionally substituted, R' and R'' are ethoxyl groups where R' is $(CH_2CH_2O)_p$ and R'' is $(CH_2CH_2O)_q$, wherein p+q is 2-15, and $[X]^-$ is a counter anion. For example, in some embodiments, the surfactant is a cocoalkylmethyl amine (e.g., cocoalkylmethyl PEG-15 ammonium chloride). The ethoxylated quaternary ammonium compound may be purchased from a commercial source. Non-limiting examples of commercially available ethoxylated quaternary ammonium compounds include ETHOQUAD® 18/25, MAQUAT® C-15, VARIQUAT® T 1210 NS).

As described herein, In some embodiments, the concentrate or the microemulsion comprises a first type of surfactant being an EO/PO block copolymer and a second type of surfactant being an ethoxylated quaternary ammonium compound.

In some embodiments, the surfactant is selected from the group consisting of polyimines and/or polyimine derivatives. In certain embodiments, a surfactant is an alkoxylated polyimine (e.g., containing —CH=N— moieties in the chemical structure). In some embodiments, the polyimine is selected to have a relative solubility number (RSN) between about 5 and about 20 (e.g., between about 5 and about 12). The polyimine may be purchased from a commercial source. Non-limiting examples of commercially available polyimines include Arbreak® 8253 from Baker Hughes Plc (Neartown, Tex.), Kemelix™ 3418x, Kemelix™ D510 from Croda International Plc (Snaith Goole, England).

In some embodiments the surfactant is an alkoxylated polyimine with a relative solubility number (RSN) in the range of 5-20. As will be known to those of ordinary skill in the art, RSN values are generally determined by titrating water into a solution of surfactant in 1,4dioxane. The RSN value is generally defined as the amount of distilled water necessary to be added to produce persistent turbidity. In some embodiments the surfactant is an alkoxylated novolac resin (also known as a phenolic resin) with a relative solubility number in the range of 5-20. In some embodiments the surfactant is a block copolymer surfactant with a total molecular weight greater than 5000 daltons. The block copolymer may have a hydrophobic block that is comprised of a polymer chain that is linear, branched, hyperbranched, dendritic or cyclic. Non-limiting examples of monomeric repeat units in the hydrophobic chains of block copolymer surfactants are isomers of acrylic, methacrylic, styrenic, isoprene, butadiene, acrylamide, ethylene, propylene and norbornene. The block copolymer may have a hydrophilic block that is comprised of a polymer chain that is linear, branched, hyper branched, dendritic or cyclic. Non-limiting examples of monomeric repeat units in the hydrophilic chains of the block copolymer surfactants are isomers of acrylic acid, maleic acid, methacrylic acid, ethylene oxide, and acrylamine.

In some embodiments, the surfactant is a sulfonate, for example, an alkyl sulfonate having 1-18 carbon atoms, an alkylaryl sulfonate having 1-18 carbon atoms, an ester or half ester of sulfosuccinic acid with monohydric alcohols or alkylphenols having 1-15 carbon atoms, or a multisulfonate (e.g., comprising two, three, four, or more, sulfonate groups). In some cases, the alcohol or alkylphenol can also be ethoxylated with 1-250 EO units (e.g., or 2-200, or 2-150, or 2-100, or 2-50, or 2-40). Non-limiting examples of sulfonates include alkylbenzene sulfonic acids (e.g., linear dodecyl benzene sulfonic acid (e.g., LAS 98 from Harcros Chemicals Inc. (Nashua, N.H.), and Biosoft® S-120 from Stepan Company Plc (Northfield, Ill.)) and branched alkylbenzene sulfonic acids (e.g., isopropylamine dodecylbenzene sulfonic acid (e.g., NINATE® 411 from Stepan Company Plc (Northfield, Ill.))).

As described herein, in some embodiments, the concentrate or the microemulsion comprises a first type of surfactant being an alkoxylated polyimine and a second type of surfactant being a sulfonate.

In some embodiments, the surfactant is an alkyl polyglycol ether, for example, having 2-250 ethylene oxide (EO) (e.g., or 2-200, or 2-150, or 2-100, or 2-50, or 2-40) units and alkyl groups of 1-20 carbon atoms. In some embodiments, the surfactant is an alkylaryl polyglycol ether having 2-250 EO units (e.g., or 2-200, or 2-150, or 2-100, or 2-50, or 2-40) and 1-20 carbon atoms in the alkyl and aryl groups.

In some embodiments, the surfactant is a fatty acid polyglycol ester having 6-24 carbon atoms and 2-250 EO units (e.g., or 2-200, or 2-150, or 2-100, or 2-50, or 2-40). In some embodiments, the surfactant is a polyglycol ether of hydroxyl-containing triglycerides (e.g., castor oil). In some embodiments, the surfactant is an alkylpolyglycoside of the general formula R"—O—$Z_n$, where R" denotes a linear or branched, saturated or unsaturated alkyl group having on average 1-24 carbon atoms and $Z_n$ denotes an oligoglycoside group having on average n=1-10 hexose or pentose units or mixtures thereof. In some embodiments, the surfactant is a fatty ester of glycerol, sorbitol, or pentaerythritol. In some embodiments, the surfactant is an amine oxide (e.g., dodecyldimethylamine oxide). In some embodiments, the surfactant is an alkyl sulfate, for example having a chain length of 1-18 carbon atoms, alkyl ether sulfates having 1-18 carbon atoms in the hydrophobic group and 1-40 ethylene oxide (EO) or propylene oxide (PO) units.

In some embodiments, the surfactant is an alkali metal salt or ammonium salt of a carboxylic acid or poly(alkylene glycol) ether carboxylic acid having 8-20 carbon atoms in the alkyl, aryl, alkaryl or aralkyl group and 1-250 EO or PO units (e.g., or 2-200, or 2-150, or 2-100, or 2-50, or 2-40). In some embodiments, the surfactant is a partial phosphoric ester or the corresponding alkali metal salt or ammonium salt, e.g., an alkyl and alkaryl phosphate having 8120 carbon atoms in the organic group, an alkylether phosphate or alkarylether phosphate having 1-20 carbon atoms in the alkyl or alkaryl group and 1-250 EO units (e.g., or 2-200, or 2-150, or 2-100, or 2-50, or 2-40). In some embodiments, the surfactant is a salt of primary, secondary, or tertiary fatty amine having 8-24 carbon atoms with acetic acid, sulfuric acid, hydrochloric acid, and phosphoric acid. In some embodiments, the surfactant is a quaternary alkyl- and alkylbenzylammonium salt, whose alkyl groups have 1-24 carbon atoms (e.g., a halide, sulfate, phosphate, acetate, or hydroxide salt).

In some embodiments, the surfactant is an alkylpyridinium, an alkylimidazolinium, or an alkyloxazolinium salt whose alkyl chain has up to 18 carbons atoms (e.g., a halide, sulfate, phosphate, acetate, or hydroxide salt). In some embodiments, the surfactant is amphoteric or zwitterionic, including sultaines (e.g., cocamidopropyl hydroxysultaine), betaines (e.g., cocamidopropyl betaine), or phosphates (e.g., lecithin). Non-limiting examples of specific surfactants include a linear $C_{12}$-$C_{15}$ ethoxylated alcohols with 5-12 moles of EO, lauryl alcohol ethoxylate with 4-8 moles of EO, nonyl phenol ethoxylate with 5-9 moles of EO, octyl phenol ethoxylate with 5-9 moles of EO, tridecyl alcohol ethoxylate with 5-9 moles of EO, Pluronic® matrix of EO/PO copolymers, ethoxylated cocoamide with 4-8 moles of EO, ethoxylated coco fatty acid with 7-11 moles of EO, and cocoamidopropyl amine oxide.

In some embodiments, the surfactant is a siloxane surfactant as described in U.S. patent application Ser. No. 13/831,410, filed Mar. 14, 2014, herein incorporated by reference.

In some embodiments, the surfactant is a Gemini surfactant. Gemini surfactants generally have the structure of multiple amphiphilic molecules linked together by one or more covalent spacers. In some embodiments, the surfactant is an extended surfactant, wherein the extended surfactants has the structure where a non-ionic hydrophilic spacer (e.g. ethylene oxide or propylene oxide) connects an ionic hydrophilic group (e.g. carboxylate, sulfate, phosphate).

In some embodiments, the microemulsion or the dilution fluid comprises a solvent. The solvent, or a combination of solvents, may be present in the microemulsion or the dilution fluid in any suitable amount. In some embodiments, the total amount of solvent present in the microemulsion or the dilution fluid is between about 1 wt % and about 99 wt %, or between about 2 wt % and about 90 wt %, or between about 1 wt % and about 60 wt %, or between about 2 wt % and about 60 wt %, or between about 1 and about 50 wt %, or between about 1 and about 30 wt %, or between about 5 wt % and about 40 wt %, or between about 5 wt % and about 30 wt %, or between about 2 wt % and about 25 wt %, or between about 5 wt % and about 25 wt %, or between about 60 wt % and about 95 wt %, or between about 70 wt % or about 95 wt %, or between about 75 wt % and about 90 wt %, or between about 80 wt % and about 95 wt %, versus the total microemulsion or dilution fluid composition.

Those of ordinary skill in the art will appreciate that microemulsions or dilution fluids comprising more than two types of solvents may be utilized in the methods, compositions, and systems described herein. For example, the microemulsion or dilution fluid may comprise more than one or two types of solvent, for example, three, four, five, six, or more, types of solvents. In some embodiments, the microemulsion or dilution fluid comprises a first type of solvent and a second type of solvent. The first type of solvent to the second type of solvent ratio in a microemulsion or dilution fluid may be present in any suitable ratio. In some embodiments, the ratio of the first type of solvent to the second type of solvent by weight is between about 4:1 and 1:4, or between 2:1 and 1:2, or about 1:1.

In some embodiments, the solvent is an unsubstituted cyclic or acyclic, branched or unbranched alkane. Non-limiting examples of unsubstituted acyclic unbranched alkanes include hexane, heptane, octane, nonane, decane, undecane, and dodecane. Non-limiting examples of unsubstituted acyclic branched alkanes isomers of methylpentane (e.g., 2-methylpentane, 3-methylpentane), isomers of dimethylbutane (e.g., 2,2-dimethylbutane, 2,3-dimethylbutane), isomers of methylhexane (e.g., 2-methylhexane, 3-methylhexane), isomers of ethylpentane (e.g., 3-ethylpentane), isomers of dimethylpentane (e.g., 2,2,-dimethylpentane, 2,3-dimethylpentane, 2,4-dimethylpentane, 3,3-dimethylpentane), isomers of trimethylbutane (e.g., 2,2,3-trimethylbutane), isomers of methylheptane (e.g., 2-methylheptane, 3-methylheptane, 4-methylheptane), isomers of dimethylhexane (e.g., 2,2-dimethylhexane, 2,3-dimethylhexane, 2,4-dimethylhexane, 2,5-dimethylhexane, 3,3-dimethylhexane, 3,4-dimethylhexane), isomers of ethylhexane (e.g., 3-ethylhexane), isomers of trimethylpentane (e.g., 2,2,3-trimethylpentane, 2,2,4-trimethylpentane, 2,3,3-trimethylpentane, 2,3,4-trimethylpentane), and isomers of ethylmethylpentane (e.g., 3-ethyl-2-methylpentane, 3-ethyl-3-methylpentane). Non-limiting examples of unsubstituted cyclic branched or unbranched alkanes include cyclohexane, methylcyclopentane, ethylcyclobutane, propylcyclopropane, isopropylcyclopropane, dimethylcyclobutane, cycloheptane, methylcyclohexane, dimethylcyclopentane, ethylcyclopentane, trimethylcyclobutane, cyclooctane, methylcycloheptane, dimethylcyclohexane, ethylcyclohexane, cyclononane, methylcyclooctane, dimethylcycloheptane, ethylcycloheptane, trimethylcyclohexane, ethylmethylcyclohexane, propylcyclohexane, and cyclodecane.

In some embodiments, the solvent is an unsubstituted acyclic branched or unbranched alkene having one or two double bonds. Non-limiting examples of unsubstituted acyclic unbranched alkenes having one or two double bonds include isomers of hexene (e.g., 1-hexene, 2-hexene), isomers of hexadiene (e.g., 1,3-hexadiene, 1,4-hexadiene), isomers of heptene (e.g., 1-heptene, 2-heptene, 3-heptene), isomers of heptadiene (e.g., 1,5-heptadiene, 1-6, heptadiene), isomers of octene (e.g., 1-octene, 2-octene, 3-octene), isomers of octadiene (e.g., 1,7-octadiene), isomers of nonene, isomers of nonadiene, isomers of decene, isomers of decadiene, isomers of undecene, isomers of undecadiene, isomers of dodecene, and isomers of dodecadiene. In some embodiments, the acyclic unbranched alkene having one or two double bonds is an alpha-olefin (e.g., 1-hexene, 1-heptene, 1-octene, 1-nonene, 1-decene, 1-undecene, 1-dodecene). Non-limiting examples unsubstituted acyclic branched alkenes include isomers of methylpentene, isomers of dimethylpentene, isomers of ethylpentene, isomers of methylethylpentene, isomers of propylpentene, isomers of methylhexene, isomers of ethylhexene, isomers of dimethylhexene, isomers of methylethylhexene, isomers of methylheptene, isomers of ethylheptene, isomers of dimethylheptene, and isomers of methylethylheptene.

In some embodiments, the solvent is a cyclic or acyclic, branched or unbranched alkane substituted with only an —OH group. Non-limiting examples of cyclic or acyclic, branched or unbranched alkanes substituted with only an —OH group include isomers of nonanol, isomers of decanol, isomers of undecanol, isomers of dodecanol, isomers of octanol (e.g., 1-octanol, 2-octanol, 3-octanol, 4-octanol), isomers of methyl heptanol, isomers of ethylhexanol (e.g., 2-ethyl-1-hexanol, 3-ethyl-1-hexanol, 4-ethyl-1-hexanol), isomers of dimethylhexanol, isomers of propylpentanol, isomers of methylethylpentanol, and isomers of trimethylpentanol.

In some embodiments, the solvent is a branched or unbranched dialkylether compound having the formula $C_nH_{2n+1}OC_mH_{2m+1}$ wherein n+m is 1-16. In some cases, n+m is 2-16, or 6-12, or 6-10, or 6-8. Non-limiting examples of branched or unbranched dialkylether compounds having the formula $C_nH_{2n+1}C_mH_{2m+1}$ include isomers of $C_3H_7OC_3H_7$, isomers of $C_4H_9OC_3H_7$, isomers of $C_5H_{11}OC_3H_7$, isomers of $C_6H_{13}OC_3H_7$, isomers of $C_4H_9OC_4H_9$, isomers of $C_4H_9OC_5H_{11}$, isomers of $C_4H_9OC_6H_{13}$, isomers of $C_5H_{11}OC_6H_{13}$, and isomers of $C_6H_{13}OC_6H_{13}$. In a particular embodiment, the branched or unbranched dialklyether is an isomer $C_6H_{13}OC_6H_{13}$ (e.g., dihexylether).

In some embodiments, the solvent is an aromatic solvent. Non-limiting examples of aromatic solvents include toluene, benzene, dimethylbenzene, butylbenzene, hexylbenzene, mesitylene, light aromatic naphtha, and heavy aromatic naphtha.

In some embodiments, the solvent is a bicyclic hydrocarbon solvent with varying degrees of unsaturation including fused, bridgehead, and spirocyclic compounds. Non-limiting examples of bicyclic solvents include isomers of decalin, tetrahydronapthalene, norbornane, norbornene, bicyclo[4.2.0]octane, bicyclo[3.2.1]octane, and spiro[5.5]dodecane.

In some embodiments, the solvent is a bicyclic hydrocarbon solvent with varying degrees of unsaturation and containing at least one O, N, or S atom including fused, bridgehead, and spirocyclic compounds. Non-limiting examples include isomers of 7 oxabicyclo[2.2.1]heptane, 4,7-epoxyisobenzofuran-1,3-dione, and 7 oxabicyclo[2.2.1]heptane-2,3-dicarboxylic acid, 2,3-dimethyl ester.

In some embodiments, at least one of the solvents present in the microemulsion or the dilution fluid is an ester of fatty acid, either naturally occurring or synthetic with the formula $R^1O(C=OR^2)$, wherein $R^1$ and $R^2$ are the same or different and are cyclic or acyclic, branched or unbranched alkyl (e.g., C1-16 alkyl), optionally substituted. In some embodiments, each of $R^1$ and $R^2$ are the same or different and are cyclic or acyclic, branched or unbranched alkyl, or optionally, provide at least one of $R^1$ and $R^2$ is methyl, ethyl, propyl, or butyl. Non-limiting examples include isomers of methyl octanoate, methyl decanoate, methyl dodecanoate, methyl undecanoate, methyl hexadecanoate, ethyl octanoate, ethyl decanoate, ethyl dodecanoate, ethyl undecanoate, ethyl hexadecanoate, propyl octanoate, propyl decanoate, propyl dodecanoate, propyl undecanoate, propyl hexadecanoate, butyl octanoate, butyl decanoate, butyl dodecanoate, butyl undecanoate, and butyl hexadecanoate. In certain embodiments, the esters are selected from the group consisting of methyl dodecanoate, methyl hexadecanoate, ethyl dodecanoate, ethyl hexadecanoate, propyl dodecanoate, propyl hexadecanoate, butyl dodecanoate, and butyl hexadecanoate. Non-limiting examples include isomers of octyl octanoate, nonyl, nonanoate, decyl decanoate, undecyl undecanoate, dodecyl decanoate, hexadecyl hexadecanoate. In certain embodiments the esters are selected from the group consisting of octyl octonoate and decyl decanoate.

In some embodiments, at least one of the solvents present in the microemulsion or the dilution fluid is a terpene or a terpenoid. In some embodiments, the terpene or terpenoid comprises a first type of terpene or terpenoid and a second type of terpene or terpenoid. Terpenes may be generally classified as monoterpenes (e.g., having two isoprene units), sesquiterpenes (e.g., having 3 isoprene units), diterpenes, or the like. The term terpenoid also includes natural degradation products, such as ionones, and natural and synthetic derivatives, e.g., terpene alcohols, aldehydes, ketones, acids, esters, epoxides, and hydrogenation products (e.g., see Ullmann's Encyclopedia of Industrial Chemistry, 2012, pages 29-45, herein incorporated by reference). It should be understood, that while much of the description herein focuses on terpenes, this is by no means limiting, and terpenoids may be employed where appropriate. In some cases, the terpene is a naturally occurring terpene. In some cases, the terpene is a non-naturally occurring terpene and/or a chemically modified terpene (e.g., saturated terpene, terpene amine, fluorinated terpene, or silylated terpene).

In some embodiments, the terpene is a monoterpene. Monoterpenes may be further classified as acyclic, monocyclic, and bicyclic (e.g., with a total number of carbons in the range between 18-20), as well as whether the monoterpene comprises one or more oxygen atoms (e.g., alcohol groups, ester groups, carbonyl groups, etc.). In some embodiments, the terpene is an oxygenated terpene, for example, a terpene comprising an alcohol, an aldehyde, and/or a ketone group. In some embodiments, the terpene comprises an alcohol group. Non-limiting examples of terpenes comprising an alcohol group are linalool, geraniol, nopol, α-terpineol, and menthol. In some embodiments, the terpene comprises an ether-oxygen, for example, eucalyptol, or a carbonyl oxygen, for example, menthone. In some embodiments, the terpene does not comprise an oxygen atom, for example, d-limonene.

Non-limiting examples of terpenes include linalool, geraniol, nopol, α-terpineol, menthol, eucalyptol, menthone, d-limonene, terpinolene, β-occimene, γ-terpinene, α-pinene, and citronellene. In a particular embodiment, the terpene is selected from the group consisting of α-terpineol, α-pinene, nopol, and eucalyptol. In one embodiment, the terpene is nopol. In another embodiment, the terpene is eucalyptol. In some embodiments, the terpene is not limonene (e.g., d-limonene). In some embodiments, the microemulsion is free of limonene. In certain embodiments, the dilution fluid is free of limonene.

In some embodiments, the terpene is a non-naturally occurring terpene and/or a chemically modified terpene (e.g., saturated terpene). In some cases, the terpene is a partially or fully saturated terpene (e.g., p-menthane, pinane). In some cases, the terpene is a non-naturally occurring terpene. Non-limiting examples of non-naturally occurring terpenes include, menthene, p-cymene, r-carvone, terpinenes (e.g., alpha-terpinenes, beta-terpinenes, gamma-terpinenes), dipentenes, terpinolenes, borneol, alpha-terpinamine, and pine oils.

In some embodiments, the terpene is classified in terms of its phase inversion temperature (PIT). The term phase inversion temperature is given its ordinary meaning in the art and refers to the temperature at which an oil in water microemulsion inverts to a water in oil microemulsion (or vice versa). Those of ordinary skill in the art will be aware of methods for determining the PIT for a microemulsion comprising a terpene (e.g., see Strey, Colloid & Polymer Science, 1994. 272(8): p. 1005-1019; Kahlweit et al., Angewandte Chemie International Edition in English, 1985. 24(8): p. 654-668). The PIT values described herein were determined using a 1:1 ratio of terpene (e.g., one or more terpenes):de-ionized water and varying amounts (e.g., between about 20 wt % and about 60 wt %; generally, between 3 and 9 different amounts are employed) of a 1:1 blend of surfactant comprising linear $C_{12}$-$C_{15}$ alcohol ethoxylates with on average 7 moles of ethylene oxide (e.g., Neodol 25-7):isopropyl alcohol wherein the upper and lower temperature boundaries of the microemulsion region can be determined and a phase diagram may be generated. Those of ordinary skill in the art will recognize that such a phase diagram (e.g., a plot of temperature against surfactant concentration at a constant oil-to-water ratio) may be referred to as fish diagram or a Kahlweit plot. The temperature at the vertex is the PIT. An exemplary fish diagram indicating the PIT is shown in FIG. 1. PITs for non-limiting examples of terpenes determined using this experimental procedure outlined above are given in Table 1.

TABLE 1

Phase inversion temperatures for non-limiting examples of terpenes.

| Terpene | Phase Inversion Temperature ° F. (° C.) |
| --- | --- |
| linalool | 24.8 (−4) |
| geraniol | 31.1 (−0.5) |
| nopol | 36.5 (2.5) |
| α-terpineol | 40.3 (4.6) |
| menthol | 60.8 (16) |
| eucalyptol | 87.8 (31) |
| menthone | 89.6 (32) |
| d-limonene | 109.4 (43) |
| terpinolene | 118.4 (48) |
| β-occimene | 120.2 (49) |
| γ-terpinene | 120.2 (49) |
| α-pinene | 134.6 (57) |
| citronellene | 136.4 (58) |

In certain embodiments, the solvent utilized in the microemulsion or the dilution fluid herein may comprise one or more impurities. For example, in some embodiments, a solvent (e.g., a terpene) is extracted from a natural source (e.g., citrus, pine), and may comprise one or more impurities present from the extraction process. In some embodiment, the solvent comprises a crude cut (e.g., uncut crude oil, for example, made by settling, separation, heating, etc.). In some embodiments, the solvent is a crude oil (e.g., naturally occurring crude oil, uncut crude oil, crude oil extracted from the wellbore, synthetic crude oil, crude citrus oil, crude pine oil, *eucalyptus*, etc.). In some embodiments, the solvent is a citrus extract (e.g., crude orange oil, orange oil, etc.).

In some embodiments, at least one of the solvents comprised in the microemulsion or the dilution fluid comprise a mutual solvent which is miscible together with the water and the solvent. In some embodiments, the mutual solvent is present in an amount between about at 0.5 wt % to about 30% of mutual solvent. Non-limiting examples of suitable mutual solvents include ethyleneglycolmonobutyl ether (EGMBE), dipropylene glycol monomethyl ether, short chain alcohols (e.g., isopropanol), tetrahydrofuran, dioxane, dimethylformamide, and dimethylsulfoxide.

Generally, the microemulsion or the dilution fluid comprises an aqueous phase. Generally, the aqueous phase comprises water. The water may be provided from any suitable source (e.g., sea water, fresh water, deionized water, reverse osmosis water, water from field production). The water may be present in any suitable amount. In some embodiments, the total amount of water present in the microemulsion or the dilution fluid is between about 1 wt % about 95 wt %, or between about 1 wt % about 90 wt %, or between about 1 wt % and about 60 wt %, or between about 5 wt % and about 60 wt %, or between about 20 wt % and about 60 wt %, or between about 45 and about 55 wt %, versus the total microemulsion composition or dilution fluid.

The water to solvent ratio in a microemulsion or the dilution fluid may be varied. In some embodiments, the ratio of water to solvent, along with other parameters of the solvent may be varied. In some embodiments, the ratio of water to solvent by weight is between about 15:1 and 1:10, or between 9:1 and 1:4, or between 3.2:1 and 1:4.

As described herein, in some embodiments, the concentrate, the concentrate solution, the emulsion or microemulsion, or the dilution fluid may comprise one or more additives in addition to water and surfactant (e.g., one or more types of surfactants). In certain embodiments, the emulsion or the microemulsion comprise one or more additives in addition to water, solvent (e.g., one or more types of solvents), and surfactant (e.g., one or more types of surfactants). In some embodiments, the additive is an alcohol, a freezing point depression agent, an acid, a salt, a proppant, a scale inhibitor, a friction reducer, a biocide, a corrosion inhibitor, a buffer, a viscosifier, a clay swelling inhibitor, an oxygen scavenger, a breaking additive (e.g., a gel breaking additive), and/or a clay stabilizer.

In some embodiments, the one or more additives comprise a viscosifier (e.g., guar, guar gum, carboxymethyl hydropropyl guar gum (CMHPG), hydroxypropyl guar (HPG), hydroxypropyl-methyl guar (MHPG), xanthan gum, carboxymethyl cellulose, etc.) and/or a bridging agent (e.g., calcium carbonate, size salt, oil-soluble resins, mica, ground cellulose, nutshells, and other fibers). In some embodiments, the dilution fluid comprises a combination of one or more viscosifiers and gelling agents (e.g., guar gum and borate). As will be generally known to one skilled in the art, the use of viscosifiers during injection into a wellbore during stimulation (e.g., fracturing) generally increases the viscosity of the injection fluid and increases the suspension of proppants (e.g., sand), thereby increasing the amount of hydrocarbons which may be extracted from the fractures.

In some embodiments, the viscosifier is present in an amount between about 0 wt % and about 10 wt % (e.g., between about 0 wt % and about 1 wt %, or between about 0.1 wt % and about 0.5 wt %), the breaking additive is present in an amount between about 0 wt % and about 10 wt % (e.g., between about 0 wt % and about 0.3 wt %, or between about 0.06 wt % and about 0.1 wt %), and the gelling agent is present in an amount between about 0 wt % and about 10 wt % (e.g., between about 0 wt % and about 0.2 wt %, or between about 0.01 wt % and about 0.05 wt %).

In some embodiments, the one or more additives comprises an alcohol. The one or more additives may comprise a single alcohol or a combination of two or more alcohols. In some embodiments, the alcohol is selected from primary, secondary and tertiary alcohols having between 1 and 20 carbon atoms. In some embodiments, the alcohol comprises a first type of alcohol and a second type of alcohol. Non-limiting examples of alcohols include methanol, ethanol, isopropanol, n-propanol, n-butanol, butanol, sec-butanol, iso-butanol, and t-butanol. In some embodiments, the alcohol is ethanol or isopropanol. In some embodiments, the alcohol is isopropanol.

The alcohol may serve as a coupling agent between a solvent and a surfactant and aid in the stabilization of a microemulsion. The alcohol may also lower the freezing point of a microemulsion.

The alcohol may be present in the microemulsion, the concentrate solution, or the dilution fluid in any suitable amount. In some embodiments, the alcohol is present in an amount between about 0 wt % and about 80 wt %, or between about 0.1 wt % and about 50 wt %, or between about 1 wt % and about 50 wt %, or between about 2 wt % and about 50 wt % or between about 5 wt % and about 40 wt %, or between about 5 wt % and 35 wt %, versus the total microemulsion composition or dilution fluid.

In some embodiments, the one or more additives comprises a salt. The presence of the salt may reduce the amount of water needed, and in addition, for example, may lower the freezing point of the microemulsion. The one or more additives may comprise a single salt or a combination of two or more salts. For example, in some embodiments, the salt comprises a first type of salt and a second type of salt. Non-limiting examples of salts include salts comprising K, Na, Br, Cr, Cs, or Li, for example, halides of these metals, including NaCl, KCl, $CaCl_2$, and $MgCl_2$.

In some embodiments, the one or more additives comprises a clay stabilizer. The one or more additives may comprise a single clay stabilizer or a combination of two or more clay stabilizers. For example, in some embodiments, the salt comprises a first type of clay stabilizer and a second type of clay stabilizer. Non-limiting examples of clay stabilizers include salts above, polymers (PAC, PHPA, etc), glycols, sulfonated asphalt, lignite, sodium silicate, and choline chloride.

In some cases, it may be desirable for the concentrate to comprise a freezing point depression agent. The concentrate may comprise a single freezing point depression agent or a combination of two or more freezing point depression agents. For example, in some embodiments, the freezing point depression agent comprises a first type of freezing point depression agent and a second type of freezing point depression agent. The term freezing point depression agent is given its ordinary meaning in the art and refers to a compound which is added to a solution to reduce the freezing point of the solution. That is, a solution comprising the freezing point depression agent has a lower freezing point as compared to an essentially identical solution not comprising the freezing point depression agent. Those of ordinary skill in the art will be aware of suitable freezing point depression agents for use in a concentrate, as described herein. Non-limiting examples of freezing point depression agents include primary, secondary, and tertiary alcohols with between 1 and 20 carbon atoms. In some embodiments, the alcohol comprises at least 2 carbon atoms, alkylene glycols including polyalkylene glycols, and salts. Non limiting examples of alcohols include methanol, ethanol, i-propanol, n propanol, t-butanol, n-butanol, n-pentanol, n-hexanol, and 2-ethylhexanol. In some embodiments, the freezing point depression agent is not methanol (e.g., due to toxicity). Non-limiting examples of alkylene glycols include ethylene glycol (EG), polyethylene glycol (PEG), propylene glycol (PG), and triethylene glycol (TEG). In some embodiments, the freezing point depression agent is not ethylene oxide (e.g., due to toxicity). In some embodiments, the freezing point depression agent comprises an alcohol and an alkylene glycol. In some embodiments, the freezing point depression agent comprises a carboxycyclic acid salt and/or a di-carboxycylic acid salt. Another non-limiting example of a freezing point depression agent is a combination of choline chloride and urea.

In some embodiments, the microemulsion comprises a freezing point depression agent. The microemulsion may comprise a single freezing point depression agent or a combination of two or more freezing point depression agents. For example, in some embodiments, the freezing point depression agent comprises a first type of freezing point depression agent and a second type of freezing point depression agent. The term freezing point depression agent is given its ordinary meaning in the art and refers to a compound which is added to a solution to reduce the freezing point of the solution. That is, a solution comprising the freezing point depression agent has a lower freezing point as compared to an essentially identical solution not comprising the freezing point depression agent. Those of ordinary skill in the art will be aware of suitable freezing point depression agents for use in the microemulsions described herein. Non-limiting examples of freezing point depression agents include primary, secondary, and tertiary alcohols with between 1 and 20 carbon atoms. In some embodiments, the alcohol comprises at least 2 carbon atoms, alkylene glycols including polyalkylene glycols, and salts. Non-limiting examples of alcohols include methanol, ethanol, i-propanol, n-propanol, t-butanol, n-butanol, n-pentanol, n-hexanol, and 2-ethyl-hexanol. In some embodiments, the freezing point depression agent is not methanol (e.g., due to toxicity). Non-limiting examples of alkylene glycols include ethylene glycol (EG), polyethylene glycol (PEG), propylene glycol (PG), and triethylene glycol (TEG). In some embodiments, the freezing point depression agent is not ethylene oxide (e.g., due to toxicity). In some embodiments, the freezing point depression agent comprises an alcohol and an alkylene glycol. In some embodiments, the freezing point depression agent comprises a carboxycyclic acid salt and/or a di-carboxycylic acid salt. Another non-limiting example of a freezing point depression agent is a combination of choline chloride and urea. In some embodiments, the microemulsion comprising the freezing point depression agent is stable over a wide range of temperatures, for example, between about −50° F. to 200° F.

In some embodiments, the dilution fluid comprises a freezing point depression agent.

The freezing point depression agent may be present in the concentrate, the microemulsion, or the dilution fluid in any suitable amount. In some embodiments, the freezing point depression agent is present in an amount between about 0 wt % and about 80 wt %, or between about 0 and 30 wt %, or between about 1 wt % and about 40 wt %, or between about 0 wt % and about 25 wt %, or between about 1 wt % and about 25 wt %, or between about 1 wt % and about 20 wt %, or between about 3 wt % and about 20 wt %, or between about 10 wt % and about 15 wt %, versus the total microemulsion composition, the concentrate, or the dilution fluid.

In some embodiments, the one or more additives comprises a breaking additive (e.g., a gel breaking additive). Non-limiting examples of breaking additives include persulfates (e.g., ammonium persulfate), perchlorates, and enzymes (e.g., hemicellulase). Other breaking additives are also possible and will be known to those skilled in the art. As will be understood by those generally skilled in the art, a breaking additive may be effective at breaking down polymer chains and decreasing the viscosity of a wellbore fluid, thereby increasing the amount of fluid that can be extracted from a wellbore. Methods to measure the viscosity of a fluid (e.g., a viscometer) will be known to those skilled in the art.

In some embodiments, the one or more additives comprises an acid (e.g., 15% HCl) and/or an acid corrosion inhibitor. As will be understood by one skilled in the art, acid corrosion inhibitors generally coat a metal surface (e.g., the surface of a pipe in a wellbore) and protect against corrosion (e.g., by an acid). Non-limiting examples of acid corrosion inhibitors include quaternary ammonium compounds, thiourea/formaldehyde copolymers, and propargyl alcohol. Other corrosion inhibitors are also possible and will be known to those skilled in the art. The total amount of the acid corrosion inhibitor present in the dilution fluid is, in some cases, between about 0 wt % and about 10 wt %, between about 0 wt % and about 1 wt %, or between about 0.1 wt % and about 0.3 wt % versus the total composition (e.g., dilution fluid).

A fluid may comprise a single acid or a combination of two or more acids. For example, in some embodiments, the acid comprises a first type of acid and a second type of acid. In certain embodiments, the acid is a di-acid. Non-limiting examples of acids include hydrochloric acid, acetic acid, formic acid, succinic acid, maleic acid, malic acid, lactic acid, and hydrochloric-hydrofluoric acids. In some embodiments, the dilution fluid or the microemulsion comprises an organic acid or an organic di-acid in the ester (or di-ester) form, whereby the ester (or di-ester) is hydrolyzed in the wellbore and/or reservoir to form the parent organic acid and an alcohol in the wellbore and/or reservoir.

In some embodiments, a fluid may comprises an acid or an acid precursor. For example, the fluid may comprise an acid when used during acidizing operations. The fluid may comprise a single acid or a combination of two or more acids. For example, in some embodiments, the acid comprises a first type of acid and a second type of acid. Non-limiting examples of acids or di-acids include hydrochloric acid, acetic acid, formic acid, succinic acid, maleic acid, malic acid, lactic acid, and hydrochloric-hydrofluoric acids. In some embodiments, the fluid comprises an organic acid or organic di-acid in the ester (or di-ester) form, whereby the ester (or diester) is hydrolyzed in the wellbore and/or reservoir to form the parent organic acid and an alcohol in the wellbore and/or reservoir.

Non-limiting examples of esters or di-esters include isomers of methyl formate, ethyl formate, ethylene glycol diformate, $\alpha,\alpha$-4-trimethyl-3-cyclohexene-1-methylformate, methyl lactate, ethyl lactate, $\alpha,\alpha$-4-trimethyl 3-cyclohexene-1-methyllactate, ethylene glycol dilactate, ethylene glycol diacetate, methyl acetate, ethyl acetate, $\alpha,\alpha$,-4-trimethyl-3-cyclohexene-1-methylacetate, dimethyl succinate, dimethyl maleate, di($\alpha,\alpha$-4-trimethyl-3-cyclohexene-1-methyl)succinate, 1-methyl-4-(1-methylethenyl)-cyclohexylformate, 1-methyl-4-(1-ethylethenyl)cyclohexylactate, 1-methyl-4-(1-methylethenyl)cyclohexylacetate, di(1-methy-4-(1-methylethenyl)cyclohexyl)succinate. In some embodiments, the acid (e.g., HCl) is in an aqueous phase (e.g., 15% HCl in water).

The total amount of the acid present in a composition (e.g., a concentrate, a concentrate solution, an emulsion or microemulsion, or a dilution fluid) may be between about 0 wt % and about 80 wt %, between about 5 wt % and about 30 wt %, or between about 10 wt % and about 20 wt % versus the composition fluid.

In certain embodiments, the additive comprises a base. Non-limiting examples of bases include sodium hydroxide and potassium hydroxide, lithium hydroxide, rubidium hydroxide, cesium hydroxide, magnesium hydroxide, thallium hydroxide, ammonium hydroxide, alkyl or aryl ammonium hydroxide, monoethanolamine, diethanolamine, triethanolamine, and compounds of a general formula $R^9$—OM, where $R^9$=methyl, ethyl, propyl, butyl, or isopropyl, and M=Li, Na, K, Rb, Cs, $NH_4$, or Tl.

In some embodiments, it is advantageous for a concentrate to comprise a base (e.g., to maintain pH). the concentrate comprises a base such that the pH of the concentrate is a neutral pH. In some embodiments, the concentrate comprises a base such that the pH of the concentrate is greater than neutral pH. A base may be present in the concentrate or the concentrate solution in any suitable amount. In some embodiments, a base is present in the concentrate or concentrate solution an amount between about 1 wt % and about 60 wt %, or between about 1 wt % and 30 wt %, or between about 1 wt % and about 10 wt % versus the total concentrate or concentrate solution composition.

In addition to those additives described above, other additives may be present in a fluid. Further non-limiting examples of other additives include proppants, scale inhibitors, friction reducers, biocides, corrosion inhibitors, buffers, viscosifiers, clay swelling inhibitors, paraffin dispersing additives, asphaltene dispersing additives, and oxygen scavengers.

Non-limiting examples of proppants (e.g., propping agents) include grains of sand, glass beads, crystalline silica (e.g., Quartz), hexamethylenetetramine, ceramic proppants (e.g., calcined clays), resin coated sands, and resin coated ceramic proppants. Other proppants are also possible and will be known to those skilled in the art.

Non-limiting examples of scale inhibitors include one or more of methyl alcohol, organic phosphonic acid salts (e.g., phosphonate salt), polyacrylate, ethane-1,2-diol, calcium chloride, and sodium hydroxide. Other scale inhibitors are also possible and will be known to those skilled in the art.

Non-limiting examples of buffers include acetic acid, acetic anhydride, potassium hydroxide, sodium hydroxide, and sodium acetate. Other buffers are also possible and will be known to those skilled in the art.

Non-limiting examples of biocides include didecyl dimethyl ammonium chloride, gluteral, Dazomet, bronopol, tributyl tetradecyl phosphonium chloride, tetrakis (hydroxymethyl) phosphonium sulfate, AQUCAR™, UCARCIDE™, glutaraldehyde, sodium hypochlorite, and sodium hydroxide. Other biocides are also possible and will be known to those skilled in the art.

Non-limiting examples of clay swelling inhibitors include quaternary ammonium chloride and tetramethylammonium chloride. Other clay swelling inhibitors are also possible and will be known to those skilled in the art.

Non-limiting examples of friction reducers include petroleum distillates, ammonium salts, polyethoxylated alcohol surfactants, and anionic polyacrylamide copolymers. Other friction reducers are also possible and will be known to those skilled in the art.

Non-limiting examples of oxygen scavengers include sulfites, and bisulfites. Other oxygen scavengers are also possible and will be known to those skilled in the art.

Non-limiting examples of paraffin dispersing additives and asphaltene dispersing additives include active acidic copolymers, active alkylated polyester, active alkylated polyester amides, active alkylated polyester imides, aromatic naphthas, and active amine sulfonates. Other paraffin dispersing additives are also possible and will be known to those skilled in the art.

In some embodiments, the other additives are present in the composition an amount between about 0 wt % about 70 wt %, or between about 0 wt % and about 30 wt %, or between about 1 wt % and about 30 wt %, or between about 1 wt % and about 25 wt %, or between about 1 and about 20 wt %, versus the total composition.

Any suitable method for injecting a fluid (e.g., concentrate, concentrate solution, emulsion or microemulsion) into a wellbore may be employed. For example, in some embodiments, the fluid, optionally diluted (e.g., with a dilution fluid), may be injected into a subterranean formation by injecting it into a well or wellbore in the zone of interest of the formation and thereafter pressurizing it into the formation for the selected distance. Methods for achieving the placement of a selected quantity of a mixture in a subterranean formation are known in the art. The well may be treated with the fluid for a suitable period of time. The fluids may be removed from the well using known techniques, including producing the well.

It should be understood, that in embodiments where a fluid (e.g., concentrate, concentrate solution, emulsion or microemulsion) is said to be injected into a wellbore, that the fluid may be diluted and/or combined with other liquid component(s) prior to and/or during injection (e.g., via straight tubing, via coiled tubing, etc.). For example, in some embodiments, the concentrate, concentrate solution, emulsion or microemulsion is diluted with an aqueous phase (e.g., water, brine, sea water, fresh water) prior to and/or during injection into the wellbore. In some embodiments, the concentrate, concentrate solution, or emulsion or microemulsion is added to a dilution fluid before, during, and/or after injection into a wellbore. In certain embodiments, the concentrate, concentrate solution, or emulsion or microemulsion is mixed with the dilution fluid (e.g., stirred) prior to injection into a wellbore. In some embodiments, the concentrate and dilution fluid are injected into a wellbore simultaneously. In certain embodiments, the concentrate, concentrate solution, or emulsion or microemulsion and dilution fluid are injected into a wellbore simultaneously.

In some cases, a concentrate, concentrate solution, or emulsion or microemulsion may be added to a dilution fluid (e.g., a stimulation fluid). In some cases, a concentrate may be added to a dilution fluid to form a concentrate solution. The concentrate, the concentrate solution, and/or the emulsion or microemulsion may be added to a dilution fluid prior to, during, and/or following addition of the dilution fluid to a wellbore. As will be understood by those of ordinary skill in the art, while guidance is provided herein regarding the amount of each component which may be present in the concentrate, as well as the ranges for dilution of the concentrate with a dilution fluid, other amounts are also possible. Dilution fluids are described in more detail herein.

In some embodiments, the dilution fluid comprises water. In some embodiments, the dilution fluid primarily comprises water. In some embodiments, the dilution fluid comprises water and one or more additives. In some embodiments, the dilution fluid comprises water and a freezing point depression additive, and one or more other additives. Non-limiting examples of additives are described herein, as well as the amount in which these additives may be present.

In certain embodiments, the dilution fluid comprises a stimulation fluid. Stimulation fluids will be generally known by those skilled in the art and may include any fluid utilized in the operation (e.g., a fracturing operation, an acidizing operation, an enhanced oil recovery operation etc.) of an oil and/or gas well comprising a wellbore to enhance the recovery of hydrocarbons from the wellbore and/or to assist in the removal of leftover drilling fluids and reservoir materials (e.g., gelled layers). Stimulation fluids may be prepared similar to dilution fluids and may comprise one or more additives, as described above.

In some embodiments, a composition for injecting into a wellbore is provided comprising a fluid (e.g., concentrate, concentrate solution, emulsion or microemulsion) as described herein and dilution fluid, wherein the fluid is present in an amount between about 0.1 and about 50 gallons per thousand gallons (gpt) per dilution fluid, or between 0.1 and about 100 gpt, or between about 0.5 and about 10 gpt, or between about 0.5 and about 2 gpt. In some embodiments, the (e.g., concentrate, concentrate solution, emulsion or microemulsion) is present in an amount between about 0.5 and about 200 gpt of the fluid, or between about 0.5 and about 100 gpt, or between about 0.5 and about 50 gpt, or between about 1 and about 50 gpt, or between about 1 and about 20 gpt, or between about 2 and about 20 gpt, or between about 2 and about 10 gpt, or between about 2 and about 5 gpt, or between about 5 and about 10. In some embodiments, the fluid is present in an amount between about 2 and about 5 gpt of the fluid. In some embodiments, the fluid contains at least about 0.5 gpt, or at least about 1 gpt, or at least about 2 gpt, or at least about 4 gpt, or at least about 10 gpt, or at least about 20 gpt, or at least about 50 gpt, or at least about 100 gpt, or at least about 200 gpt, of an fluid. In some embodiments, the fluid contains less than or equal to about 200 gpt, or less than or equal to about 100 gpt, or less than or equal to about 50 gpt, or less than or equal to about 20 gpt, or less than or equal to about 10 gpt, or less than or equal to about 4 gpt, or less than or equal to about 2 gpt, or less than or equal to about 1 gpt, or less than or equal to about 0.5 gpt of an emulsion or microemulsion.

As will be understood by those of ordinary skill in the art, while guidance is provided herein regarding the amount of each component which may be present in the concentrate, as well as the ranges for dilution of the concentrate with a dilution fluid, other amounts are also possible.

Incorporation of a concentrate or a microemulsion into a dilution fluid can aid in oil and water recovery, for example, by preventing the formation of, breaking down and/or reducing gelled layers. In some embodiments, the addition of a concentrate (or concentrate solution) or an emulsion as described herein to a dilution fluid injected into a wellbore has many advantages as compared to the use of the dilution fluid alone, including, for example, increasing the transfer and/or recovery of injected fluids, increasing oil and/or gas recovery, preventing and/or increasing the breakdown of gelled layers, increasing the removal of gelled layers (e.g., fluid and solids from the reservoir which may block optimal flow of the wellbore) from the fractures allowing for more effective acid treatment, and/or other benefits as described herein. In some embodiments, the concentrate or the microemulsion is combined with a dilution fluid (e.g., prior to and/or during addition to a wellbore). In some embodiments, the dilution fluid comprises an additive. Additives are described in more detail above in connection with emulsions or microemulsions. In certain embodiments, the additive is an acid and/or an acid corrosion inhibitor. In some embodiments, the acid corrosion inhibitor comprises propargyl alcohol. In some cases, the dilution fluid may comprise a breaking additive. In some embodiments, the breaking additive is ammonium persulfate. In certain embodiments, the dilution fluid comprises a polymer (e.g., comprising guar), a crosslinker (e.g., comprising borate), and/or a breaking additive (e.g., ammonium persulfate).

In certain embodiments, the addition of a concentrate to a dilution fluid forms an emulsion or a microemulsion. For example, in embodiments wherein the concentrate does not comprise a solvent or aqueous phase, the concentrate may be added to a dilution fluid comprising both a solvent and an aqueous phase, whereby an emulsion or microemulsion forms. The fluid formed comprising the emulsion or microemulsion may be a fluid used in the treatment of a wellbore for the prevention of the formation, breakdown, and/or removal of gelled layers, as described herein. For example, in some embodiments, the concentrate is added to a dilution fluid to form a treatment fluid comprising an emulsion or a microemulsion, followed by addition of the treatment fluid to the wellbore. As another example, the concentrate may be added to the dilution fluid during addition of the dilution fluid to the wellbore, thereby forming a treatment fluid comprising an emulsion or microemulsion during addition of the dilution fluid to the wellbore. As yet another example, the dilution fluid may be added to the wellbore, and then the concentrate may be added to the wellbore, wherein the emulsion or microemulsion forms in the wellbore. Combinations of the steps are also possible. In some embodiments, the emulsion or microemulsion is prepared by mixing (e.g., stirring and/or shearing) the concentrate with an aqueous phase (e.g., water and/or a first solvent) and/or a solvent (e.g., a second solvent).

In other embodiments, however, the addition of a concentrate to a dilution fluid does not form an emulsion or a microemulsion.

Those of ordinary skill in the art will be able to scale the amounts of each type of component described herein with respect to concentrates to form emulsions or microemulsions upon dilution. Furthermore, one of ordinary skill in the art will be able to also adjust the amounts of the components based on teachings described herein with respect to dilution of the emulsion or microemulsions with a dilution fluid.

As will be known to those of ordinary skill in the art, laboratory tests may be conducted to determine the effectiveness of a concentrate (or concentrate solution) and/or emulsion or a microemulsion to prevent the formation of, breakdown, and/or reduce a gelled layer. In some embodiments, to determine breakdown and/or reduction of a gelled layer (e.g., which would be present in an oil and/or gas layer), a gelled layer in a container (e.g., a graduated cylinder) may be provided. A concentrate (or concentrate solution) or emulsion or microemulsion, as described herein, may be added to the container comprising the gelled layer. In some cases, the gelled layer and the concentrate and/or emulsion or microemulsion solution may be mixed. The effectiveness of the concentrate and/or emulsion or microemulsion to breakdown and/or reduce the gelled layer may be determined by comparing the results to a blank sample (e.g., a similar container placed under similar conditions, but with no concentrate or emulsion or microemulsion added and/or the gelled layer in the container prior to addition of the concentrate or emulsion or microemulsion). The breakdown and/or reduction of the gelled layer may be measured after a suitable amount of time has elapsed (e.g., 15 minutes, 30 minutes, 60 minutes, 120 minutes).

In some embodiments, the effectiveness of a concentrate (or concentrate solution) and/or emulsion or microemulsion to prevent the formation, breakdown and/or reduce a gelled layer can be determined by calculating the percent change of volume of the gelled layer in the solution following addition of the concentrate (or concentrate solution) and/or emulsion or microemulsion as compared to the volume of the gelled layer before the addition of a concentrate and/or emulsion or microemulsion (e.g., a blank sample). In some embodiments, the percent change in volume of the gelled layer after the addition of a concentrate and/or emulsion or microemulsion as compared to the volume of gelled layer before the addition of a concentrate and/or emulsion or microemulsion is greater than or equal to about 10 vol %, greater than or equal to about 20 vol %, greater than or equal to about 40 vol %, greater than or equal to about 50 vol %, greater than or equal to about 60 vol %, greater than or equal to about 70 vol %, greater than or equal to about 90 vol %, greater than or equal to about 95 vol %, or greater than or equal to about 99 vol %. In some cases, the concentrate and/or emulsion or microemulsion results in the complete breakdown of the gelled layer (i.e. a percent change in volume of the gelled layer after the addition of a concentrate and/or emulsion or microemulsion of 100 vol %).

In some embodiments, to determine prevention and/or breakdown of a gelled layer, the concentrate and/or emulsion or microemulsion may be added to a solution (e.g., comprising a guar polymer and a crosslinking agent, comprising an acid corrosion inhibitor, comprising an aqueous phase and a non-aqueous phase) and provided to a container, wherein a gelled layer would generally form in the container following addition of the solution not comprising the concentrate and/or emulsion or microemulsion. The effectiveness of the concentrate and/or emulsion or microemulsion to prevent and/or breakdown the gelled layer may be determined by comparing the results to a blank sample (e.g., a similar container placed under similar conditions, but with no concentrate or emulsion or microemulsion included in the added solution). In certain embodiments, the percent difference in volume of the gelled layer formed in the absence of a concentrate (or concentrate solution) and/or emulsion or microemulsion compared to the volume of the gelled layer formed in the presence of a concentrate (or concentrate solution) and/or emulsion or microemulsion is greater than or equal to about 10 vol %, greater than or equal to about 20 vol %, greater than or equal to about 40 vol %, greater than or equal to about 50 vol %, greater than or equal to about 60 vol %, greater than or equal to about 70 vol %, greater than or equal to about 90 vol %, greater than or equal to about 95 vol %, or greater than or equal to about 99 vol %. In some cases, the concentrate (or concentrate solution) and/or emulsion or microemulsion results in the complete prevention of the gelled layer (i.e., essentially no gelled layer formed in the presence of a concentrate and/or emulsion or microemulsion.

For convenience, certain terms employed in the specification, examples, and appended claims are listed here.

Definitions of specific functional groups and chemical terms are described in more detail below. For purposes of this invention, the chemical elements are identified in accordance with the Periodic Table of the Elements, CAS version, *Handbook of Chemistry and Physics*, 75$^{th}$ Ed., inside cover, and specific functional groups are generally defined as described therein. Additionally, general principles of organic chemistry, as well as specific functional moieties and reactivity, are described in *Organic Chemistry*, Thomas Sorrell, University Science Books, Sausalito: 1999, the entire contents of which are incorporated herein by reference.

Certain compounds of the present invention may exist in particular geometric or stereoisomeric forms. The present invention contemplates all such compounds, including cis- and trans-isomers, R- and S-enantiomers, diastereomers, (D)-isomers, (L)-isomers, the racemic mixtures thereof, and other mixtures thereof, as falling within the scope of the invention. Additional asymmetric carbon atoms may be present in a substituent such as an alkyl group. All such isomers, as well as mixtures thereof, are intended to be included in this invention.

Isomeric mixtures containing any of a variety of isomer ratios may be utilized in accordance with the present invention. For example, where only two isomers are combined, mixtures containing 50:50, 60:40, 70:30, 80:20, 90:10, 95:5, 96:4, 97:3, 98:2, 99:1, or 100:0 isomer ratios are all contemplated by the present invention. Those of ordinary skill in the art will readily appreciate that analogous ratios are contemplated for more complex isomer mixtures.

The term "aliphatic," as used herein, includes both saturated and unsaturated, nonaromatic, straight chain (i.e. unbranched), branched, acyclic, and cyclic (i.e. carbocyclic) hydrocarbons, which are optionally substituted with one or more functional groups. As will be appreciated by one of ordinary skill in the art, "aliphatic" is intended herein to include, but is not limited to, alkyl, alkenyl, alkynyl, cycloalkyl, cycloalkenyl, and cycloalkynyl moieties. Thus, as used herein, the term "alkyl" includes straight, branched and cyclic alkyl groups. An analogous convention applies to other generic terms such as "alkenyl", "alkynyl", and the like. Furthermore, as used herein, the terms "alkyl", "alkenyl", "alkynyl", and the like encompass both substituted and unsubstituted groups. In certain embodiments, as used herein, "aliphatic" is used to indicate those aliphatic groups (cyclic, acyclic, substituted, unsubstituted, branched or unbranched) having 1-20 carbon atoms. Aliphatic group substituents include, but are not limited to, any of the substituents described herein, that result in the formation of a stable moiety (e.g., aliphatic, alkyl, alkenyl, alkynyl, heteroaliphatic, heterocyclic, aryl, heteroaryl, acyl, oxo, imino, thiooxo, cyano, isocyano, amino, azido, nitro, hydroxyl, thiol, halo, aliphaticamino, heteroaliphaticamino, alkylamino, heteroalkylamino, arylamino, heteroarylamino, alkylaryl, arylalkyl, aliphaticoxy, heteroaliphaticoxy, alkyloxy, heteroalkyloxy, aryloxy, heteroaryloxy, aliphaticthioxy, heteroaliphaticthioxy, alkylthioxy, heteroalkylthioxy, arylthioxy, heteroarylthioxy, acyloxy, and the like, each of which may or may not be further substituted).

The term "alkane" is given its ordinary meaning in the art and refers to a saturated hydrocarbon molecule. The term "branched alkane" refers to an alkane that includes one or more branches, while the term "unbranched alkane" refers to an alkane that is straight-chained. The term "cyclic alkane" refers to an alkane that includes one or more ring structures, and may be optionally branched. The term "acyclic alkane" refers to an alkane that does not include any ring structures, and may be optionally branched.

The term "alkene" is given its ordinary meaning in the art and refers to an unsaturated hydrocarbon molecule that includes one or more carbon-carbon double bonds. The term "branched alkene" refers to an alkene that includes one or more branches, while the term "unbranched alkene" refers to an alkene that is straight-chained. The term "cyclic alkene" refers to an alkene that includes one or more ring structures, and may be optionally branched. The term "acyclic alkene" refers to an alkene that does not include any ring structures, and may be optionally branched.

The term "aromatic" is given its ordinary meaning in the art and refers to aromatic carbocyclic groups, having a single ring (e.g., phenyl), multiple rings (e.g., biphenyl), or multiple fused rings in which at least one is aromatic (e.g., 1,2,3,4-tetrahydronaphthyl, naphthyl, anthryl, or phenanthryl). That is, at least one ring may have a conjugated pi electron system, while other, adjoining rings can be cycloalkyls, cycloalkenyls, cycloalkynyls, aryls and/or heterocyclyls.

The term "aryl" is given its ordinary meaning in the art and refers to aromatic carbocyclic groups, optionally substituted, having a single ring (e.g., phenyl), multiple rings (e.g., biphenyl), or multiple fused rings in which at least one is aromatic (e.g., 1,2,3,4-tetrahydronaphthyl, naphthyl, anthryl, or phenanthryl). That is, at least one ring may have a conjugated pi electron system, while other, adjoining rings can be cycloalkyls, cycloalkenyls, cycloalkynyls, aryls and/ or heterocyclyls. The aryl group may be optionally substituted, as described herein. Substituents include, but are not limited to, any of the previously mentioned substituents, i.e., the substituents recited for aliphatic moieties, or for other moieties as disclosed herein, resulting in the formation of a stable compound. In some cases, an aryl group is a stable mono- or polycyclic unsaturated moiety having preferably 3-14 carbon atoms, each of which may be substituted or unsubstituted.

The term "amine" is given its ordinary meaning in the art and refers to a primary (—NH$_2$), secondary (—NHR$_x$), tertiary (—NR$_x$R$_y$), or quaternary (—N$^+$R$_x$R$_y$R$_z$) amine (e.g., where R$_x$, R$_y$, and R$_z$ are independently an aliphatic, alicyclic, alkyl, aryl, or other moieties, as defined herein).

octane. The tube was mixed briefly on a vortex mixture to ensure homogeneity and then 5 ml of crude oil was placed in the tube, on top of the broken gel. The tube was placed in a 60° C. water bath for 30 minutes so the temperature could equilibrate at which point the oil and water were mixed for one minute by a spatula blade attached to a DREMEL® tool rotating at 5000 rpm. After the mixing was complete, the tube was transferred back to the water bath and the interface quality (i.e. percentage of sample comprising a remaining gelled layer) were recorded at 1, 5, 15, 30 and 60 minutes intervals by taking photographs. Results are plotted in Table 2. Negative values of normalized percent change in gelled layer indicate that the gelled layer has increased in size with respect to blank for a certain solvent.

TABLE 2

| Solvent | % of aqueous phase which is gelled layer after 60 min | | | | % change in gelled layer normalized to blank after 60 min | | | |
| --- | --- | --- | --- | --- | --- | --- | --- | --- |
|  | Run 1 | Run 2 | Run 3 | Run 4 | Run 1 | Run 2 | Run 3 | Run 4 |
| Blank | 18% | 10% | 48% | 50% | 0% | 0% | 0% | 0% |
| Solvent 1 | 6% | 2% | 10% | 0% | 67% | 80% | 79% | 100% |
| Solvent 2 | 16% | 4% | 8% | 18% | 11% | 60% | 83% | 64% |
| Solvent 3 | 26% | 6% | 8% | 4% | −44% | 40% | 83% | 92% |
| Solvent 4 | 10% | 2% | 4% | 0% | 44% | 80% | 92% | 100% |
| Solvent 5 | 8% | 16% | 12% | 6% | 56% | −60% | 75% | 88% |
| Solvent 6 | 14% | 4% | 16% | 10% | 22% | 60% | 67% | 80% |
| Solvent 7 | 32% | 4% | 2% | 0% | −78% | 60% | 96% | 100% |
| Solvent 8 | 8% | 14% | 10% | 14% | 56% | −40% | 79% | 72% |

The term "amide" is given its ordinary meaning in the art and refers to a compound containing a nitrogen atom and a carbonyl group of the structure R$_x$CONR$_y$R$_z$ (e.g., where R$_x$, R$_y$, and R$_z$ are independently an aliphatic, alicyclic, alkyl, aryl, or other moieties, as defined herein).

These and other aspects of the present invention will be further appreciated upon consideration of the following Examples, which are intended to illustrate certain particular embodiments of the invention but are not intended to limit its scope, as defined by the claims.

EXAMPLE 1

One liter of 2% potassium chloride (KCl) was added to a 1.2 liter blender cup and stirred at a speed which did not entrain any air. To produce a concentration of 25 lbs/MGal, polymer (e.g., 3 g of guar) was added and was stirred until it was completely hydrated (15-30 minutes). Once the polymer was completely hydrated, a base (e.g., potassium hydroxide) was added until the pH reached 10, at which point a breaking additive was added (e.g., 0.160 g of the ammonium persulfate). A crosslinking agent was added at a concentration of 0.5 gpt (gallons per thousand). The fluid was heated at 180° F. overnight to ensure a substantial breaking of the polymer (e.g., a viscosity of less than 10 centipoise at a shear rate of 511 s$^{-1}$).

5 ml of the broken gel was placed in a graduated tube and a 10 µl micropipette was used to inject 5 µl of an emulsion (comprising between about 40 and about 50 wt % water, between about 30 and about 40 wt % of one or more surfactants (e.g., an EO/PO block copolymer and an ethoxylated quaternary ammonium compound), between about 15 and about 25 wt % freezing point depression agent (e.g., propylene glycol), and between about 5 and about 15 wt % solvent) into the broken gel to give a 1 gpt dilution. The solvents utilized included alpha-terpineol, d-limonene, gamma-terpinene, nopol, alpha-pinene, octanol, xylene, and

EXAMPLE 2

411 g of 36.5% HCl was mixed with 589 g of deionized water to make 15% HCl. 2000 µl of a propargyl alcohol based acid corrosion inhibitor was added to the 15% HCl solution and the fluid was shaken well to ensure homogeneity.

15 mL of the acid system was transferred to an 8 dram vial. Using a 100 µL micropipette, 15 µL of the select concentrate formulation was added to the acid system and mixed briefly on a vortex mixer to ensure uniformity. The concentrate formulation comprised one or more surfactants (e.g., a polyimine, a sulfonate, an alpha olefin sulfonate, an alcohol ethoxylate, or combinations thereof), a base (e.g., monoethanolamine), a freezing point depression agent (e.g., isopropyl alcohol, propylene glycol), and water. 5 mL of the crude oil was layered on top of the aqueous phase with a 20 mL syringe to give 20 mL total of fluid. The vials were placed in a 150° F. water bath and incubated for 30 minutes. The vials were then mixed for 30 seconds on the vortex mixer (Fisher Scientific, setting 10) before starting a timer for the test. Samples were removed and photographed at 5, 30, 60 and 120 minutes to document the separation.

Table 3 below summarizes the percentage of oil and water separation (i.e. the percentage of the aqueous phase separated from the oil/water emulsion), the percentage of gelled layer remaining in the oil after 2 hours, and the percent reduction of the gelled layer relative to an untreated (blank) sample for a single surfactant type. A mixture of a first surfactant type (e.g., a polyimine) and a second surfactant type (e.g., a sulfonate) had a percent oil/water separation of 100%, a percent gelled layer in oil after 2 hours of 0%, and a % reduction in gelled layer normalized to blank of 100%, as compared to the use of a single surfactant type and/or blank as described in Table 3.

TABLE 3

| Surfactant Type | % oil/water separation | % Gelled layer in oil after 2 hours | % Reduction in gelled layer normalized to blank |
|---|---|---|---|
| Blank (15% HCl with 2 gpt of propargyl alcohol acid corrosion inhibitor) | 100% | 80% | 0% |
| Sulfosuccinate | 93% | 90% | −13% |
| EO/PO Block Copolymer | 93% | 100% | −25% |
| Ethoxylated Alcohol | 99% | 75% | 6% |
| Alkoxylated Polyamine | 95% | 95% | −19% |
| Olefin Sulfonate | 99% | 75% | 6% |
| Ethoxylated acetylenic diol | 95% | 90% | −13% |
| Benzalkonium Chloride | 97% | 99% | −24% |
| Polyol Akoxylate | 97% | 99% | −24% |
| Sulfonate | 100% | 5% | 94% |
| Sulfonate | 100% | 50% | 38% |
| Sulfonate | 97% | 80% | 0% |
| Sulfonate | 93% | 70% | 13% |
| Sulfonate | 93% | 100% | −25% |
| Sulfonate | 93% | 100% | −25% |
| Sulfonate | 95% | 100% | −25% |
| Sulfonate | 97% | 100% | −25% |
| Polyimine | 100% | 5% | 94% |
| Polyimine | 99% | 99% | −24% |
| Polyimine | 100% | 2% | 98% |
| Polyimine | 99% | 99% | −24% |
| Polyimine | 99% | 98% | −23% |
| Polyimine | 95% | 100% | −25% |
| Polyimine | 100% | 55% | 31% |

While several embodiments of the present invention have been described and illustrated herein, those of ordinary skill in the art will readily envision a variety of other means and/or structures for performing the functions and/or obtaining the results and/or one or more of the advantages described herein, and each of such variations and/or modifications is deemed to be within the scope of the present invention. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings of the present invention is/are used. Those skilled in the art will recognize, or be able to ascertain using no more than routine experimentation, many equivalents to the specific embodiments of the invention described herein. It is, therefore, to be understood that the foregoing embodiments are presented by way of example only and that, within the scope of the appended claims and equivalents thereto, the invention may be practiced otherwise than as specifically described and claimed. The present invention is directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present invention.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e. elements that are conjunctively present in some cases and disjunctively present in other cases. Other elements may optionally be present other than the elements specifically identified by the "and/or" clause, whether related or unrelated to those elements specifically identified unless clearly indicated to the contrary. Thus, as a non-limiting example, a reference to "A and/or B," when used in conjunction with open-ended language such as "comprising" can refer, in one embodiment, to A without B (optionally including elements other than B); in another embodiment, to B without A (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e. the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element or a list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," and the like are to be understood to be open-ended, i.e. to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. A method for breaking down and/or removing a gelled layer in an oil and/or gas well having a wellbore, comprising:
   injecting a concentrate comprising surfactant, wherein the surfactant comprises and alkoxylated polimine;
   forming the gelled layer in the presence of an acid and an acid corrosion inhibitor, wherein the acid corrosion inhibitor comprises propargyl alcohol; and
   breaking down and/or removing the gelled layer.

2. The method according to claim 1, wherein the concentrate is combined with a first type of dilution fluid prior to and/or during the injecting step to form a concentrate solution.

3. The method according to claim 2, wherein the concentrate is combined with a second type of dilution fluid prior to and/or during the injecting step to form a concentrate solution.

4. The method according to claim 2, wherein the first type of dilution fluid comprises a freezing point depression agent.

5. The method according to claim 4, wherein the freezing point depression agent is present in the concentrate solution in an amount between 0 wt % and about 80 wt % versus the total concentrate solution.

6. The method according to claim 3, wherein the first and/or second type of dilution fluid comprises a base.

7. The method according to claim 6, wherein the base is present in the first and/or second type of dilution fluid in an amount between about 1 wt % and about 60 wt % versus the first and/or second type of dilution fluid composition.

8. The method according to claim 3, wherein the first and/or second type of dilution fluid comprises an aqueous phase.

9. The method according to claim 8, wherein the aqueous phase comprises water.

10. The method according to claim 8, wherein the aqueous phase is present in the first and/or second type of dilution fluid in an amount between about 1 wt % and about 90 wt % versus the first and/or second type of dilution fluid composition.

11. The method according to claim 2, wherein the step of combining addition of the concentrate to the first type of dilution fluid form an emulsion or a microemulsion.

12. The method according to claim 3, wherein the first and/or second type of dilution fluid comprises an acid corrosion inhibitor.

13. The method according to claim 12, wherein the acid corrosion inhibitor is present in the first and/or second type of dilution fluid in an amount between about 0 wt % and about 10 wt % versus the first and/or second type of dilution fluid composition.

* * * * *

UNITED STATES PATENT AND TRADEMARK OFFICE
CERTIFICATE OF CORRECTION

PATENT NO. : 10,294,757 B2
APPLICATION NO. : 14/811133
DATED : May 21, 2019
INVENTOR(S) : Angus Fursdon-Welsh et al.

Page 1 of 1

It is certified that error appears in the above-identified patent and that said Letters Patent is hereby corrected as shown below:

In the Claims

Column 36, Claim 1, Line 63, "and alkoxylated polimine" should be "an alkoxylated polyimine"

Signed and Sealed this
Third Day of September, 2019

Andrei Iancu
*Director of the United States Patent and Trademark Office*